(12) United States Patent
Cooper et al.

(10) Patent No.: US 9,137,633 B2
(45) Date of Patent: Sep. 15, 2015

(54) SYSTEM AND METHOD OF WIRELESS DOWNLOADS OF MAP AND GEOGRAPHIC BASED DATA TO PORTABLE COMPUTING DEVICES

(71) Applicant: TIERRAVISION, INC., La Jolla, CA (US)

(72) Inventors: Clive W. R. Cooper, La Jolla, CA (US); Alfred M. Wallner, San Diego, CA (US)

(73) Assignee: TIERRAVISION, INC., La Jolla, CA (US)

( * ) Notice: Subject to any disclaimer, the term of this patent is extended or adjusted under 35 U.S.C. 154(b) by 0 days.

(21) Appl. No.: 14/177,108

(22) Filed: Feb. 10, 2014

(65) Prior Publication Data

US 2014/0155102 A1   Jun. 5, 2014
US 2015/0126221 A9   May 7, 2015

Related U.S. Application Data

(63) Continuation of application No. 13/464,654, filed on May 4, 2012, now Pat. No. 8,649,968, which is a continuation of application No. 13/185,052, filed on Jul. 18, 2011, now Pat. No. 8,195,389, which is a (Continued)

(51) Int. Cl.
 *G01C 21/26* (2006.01)
 *H04W 4/02* (2009.01)

(52) U.S. Cl.
 CPC  *H04W 4/02* (2013.01); *G01C 21/26* (2013.01)

(58) Field of Classification Search
 USPC ................................................. 701/400, 409
 See application file for complete search history.

(56) References Cited

U.S. PATENT DOCUMENTS

| | | | |
|---|---|---|---|
| 4,520,506 | A | 5/1985 | Chan et al. |
| 4,630,209 | A | 12/1986 | Saito et al. |
| 4,780,717 | A | 10/1988 | Takanabe et al. |
| 4,888,698 | A | 12/1989 | Driessen et al. |

(Continued)

FOREIGN PATENT DOCUMENTS

| | | |
|---|---|---|
| EP | 0816802 | 1/1998 |
| EP | 0932134 | 7/1999 |

(Continued)

OTHER PUBLICATIONS

"AutoCAD Map 2000i, Release 4.5," Autodesk, Inc.; May 31, 2000; 230 pgs.

(Continued)

*Primary Examiner* — Yonel Beaulieu
(74) *Attorney, Agent, or Firm* — Knobbe Martens Olson & Bear LLP

(57) ABSTRACT

Systems and methods of managing map data on electronic devices are disclosed. In one aspect, a method of downloading pushpin data for a map is disclosed. The method includes receiving, from an electronic network, an indication of a current map segment, the current map segment comprising map data for a current location of a device, the current map segment corresponding to a portion of a map displayed on the device, receiving pushpin criteria for the device, identifying pushpin data based on the current map segment and the pushpin criteria, the pushpin data indicating a pushpin location; and transmitting, on the electronic network, the pushpin data.

24 Claims, 27 Drawing Sheets

Related U.S. Application Data continuation of application No. 12/543,305, filed on Aug. 18, 2009, now Pat. No. 8,014,945, which is a continuation of application No. 11/222,208, filed on Sep. 7, 2005, now abandoned.

(60) Provisional application No. 60/607,895, filed on Sep. 7, 2004, provisional application No. 60/627,393, filed on Nov. 12, 2004.

(56) References Cited

U.S. PATENT DOCUMENTS

| | | |
|---|---|---|
| 4,970,682 A | 11/1990 | Beckwith et al. |
| 4,972,319 A | 11/1990 | Delorme |
| 5,202,829 A | 4/1993 | Geier |
| 5,299,300 A | 3/1994 | Femal et al. |
| 5,444,618 A | 8/1995 | Seki et al. |
| 5,543,789 A | 8/1996 | Behr et al. |
| 5,561,664 A | 10/1996 | Gilmore et al. |
| 5,629,854 A | 5/1997 | Schulte |
| 5,694,534 A | 12/1997 | White et al. |
| 5,699,255 A | 12/1997 | Ellis |
| 5,727,057 A | 3/1998 | Emery |
| 5,737,508 A | 4/1998 | Feigenbaum |
| 5,751,612 A | 5/1998 | Donovan et al. |
| 5,754,846 A | 5/1998 | Janse et al. |
| 5,802,492 A | 9/1998 | Delorme et al. |
| 5,839,088 A | 11/1998 | Hancock et al. |
| 5,848,373 A | 12/1998 | Delorme et al. |
| 5,881,074 A | 3/1999 | Rao |
| 5,884,218 A | 3/1999 | Nimura et al. |
| 5,889,493 A | 3/1999 | Endo |
| 5,890,070 A | 3/1999 | Hamada |
| 5,946,687 A | 8/1999 | Gehani |
| 5,953,722 A | 9/1999 | Lampert et al. |
| 5,966,135 A | 10/1999 | Roy et al. |
| 5,968,109 A | 10/1999 | Israni et al. |
| 5,974,419 A | 10/1999 | Ashby |
| 5,987,381 A | 11/1999 | Oshizawa |
| 6,018,695 A | 1/2000 | Ahrens et al. |
| 6,038,559 A | 3/2000 | Ashby et al. |
| 6,049,753 A | 4/2000 | Nimura |
| 6,055,478 A | 4/2000 | Heron |
| 6,073,075 A | 6/2000 | Kondou |
| 6,073,076 A | 6/2000 | Crowley |
| 6,076,039 A | 6/2000 | Kabel et al. |
| 6,081,803 A | 6/2000 | Ashby |
| 6,092,076 A | 7/2000 | McDonough et al. |
| 6,107,944 A | 8/2000 | Behr et al. |
| 6,122,520 A | 9/2000 | Want |
| 6,122,594 A | 9/2000 | Tamaki et al. |
| 6,141,454 A | 10/2000 | Seymour et al. |
| 6,163,749 A | 12/2000 | McDonough et al. |
| 6,178,380 B1 | 1/2001 | Millington |
| 6,188,955 B1 | 2/2001 | Robinson et al. |
| 6,201,498 B1 | 3/2001 | Fan |
| 6,222,483 B1 | 4/2001 | Twitchell et al. |
| 6,240,360 B1 | 5/2001 | Phelan |
| 6,247,019 B1 | 6/2001 | Davies |
| 6,249,740 B1 | 6/2001 | Ito |
| 6,253,151 B1 | 6/2001 | Ohler |
| 6,262,741 B1 | 7/2001 | Davies |
| 6,263,343 B1 | 7/2001 | Hirono |
| 6,278,939 B1 | 8/2001 | Robare et al. |
| 6,292,745 B1 | 9/2001 | Robare et al. |
| 6,295,502 B1 | 9/2001 | Hancock et al. |
| 6,304,212 B1 | 10/2001 | Aoki |
| 6,307,573 B1 | 10/2001 | Barros |
| 6,308,177 B1 | 10/2001 | Israni et al. |
| 6,321,158 B1 | 11/2001 | Delorme |
| 6,324,467 B1 | 11/2001 | Machii et al. |
| 6,330,453 B1 | 12/2001 | Suzuki |
| 6,334,087 B1 | 12/2001 | Nakano et al. |
| 6,336,073 B1 | 1/2002 | Ihara et al. |
| 6,343,290 B1 | 1/2002 | Cossins |
| 6,363,392 B1 | 3/2002 | Halstead |
| 6,393,149 B2 | 5/2002 | Friederich |
| 6,424,933 B1 | 7/2002 | Agrawala et al. |
| 6,477,526 B2 | 11/2002 | Hayashi |
| 6,487,495 B1 | 11/2002 | Gale et al. |
| 6,505,186 B1 | 1/2003 | Muro et al. |
| 6,510,458 B1 | 1/2003 | Berstis |
| 6,522,886 B1 | 2/2003 | Youngs et al. |
| 6,526,284 B1 | 2/2003 | Sharp et al. |
| 6,532,475 B1 | 3/2003 | Nakano |
| 6,556,919 B2 | 4/2003 | Suzuki et al. |
| 6,574,551 B1 | 6/2003 | Maxwell et al. |
| 6,584,328 B1 | 6/2003 | Kung |
| 6,591,270 B1 | 7/2003 | White |
| 6,628,278 B1 | 9/2003 | Ritter |
| 6,636,802 B1 | 10/2003 | Nakano |
| 6,647,336 B1 | 11/2003 | Iwata |
| 6,661,372 B1 | 12/2003 | Girerd et al. |
| 6,662,016 B1 | 12/2003 | Buckham et al. |
| 6,674,849 B1 | 1/2004 | Froeberg |
| 6,703,947 B1 | 3/2004 | Wallner |
| 6,704,645 B1 | 3/2004 | Beesley et al. |
| 6,708,112 B1 | 3/2004 | Beesley et al. |
| 6,718,344 B2 | 4/2004 | Hirono |
| 6,748,426 B1 | 6/2004 | Shaffer |
| 6,795,450 B1 | 9/2004 | Mills et al. |
| 6,868,088 B2 | 3/2005 | Gibson et al. |
| 6,898,516 B2 | 5/2005 | Pechatnikov et al. |
| 6,911,918 B2 | 6/2005 | Chen |
| 6,912,596 B2 | 6/2005 | Skidmore et al. |
| 6,963,294 B2 | 11/2005 | Kurosawa |
| 6,973,386 B2 | 12/2005 | Gibbs |
| 6,983,313 B1 | 1/2006 | Korkea-Aho |
| 7,010,567 B1 | 3/2006 | Mori |
| 7,047,428 B2 | 5/2006 | Bui |
| 7,049,981 B2 | 5/2006 | Behr |
| 7,054,947 B2 | 5/2006 | Yun |
| 7,079,551 B2 | 7/2006 | Shivnan |
| 7,174,243 B1 | 2/2007 | Lightner et al. |
| 7,181,438 B1 | 2/2007 | Szabo |
| 7,363,126 B1 | 4/2008 | Zhong et al. |
| 7,496,082 B2 | 2/2009 | Lee |
| 7,532,158 B2 | 5/2009 | Tekinay et al. |
| 7,532,907 B2 | 5/2009 | Louks et al. |
| 7,565,155 B2 | 7/2009 | Sheha et al. |
| 7,577,520 B2 | 8/2009 | Nomura |
| 7,698,057 B2 | 4/2010 | Kobayashi et al. |
| 7,705,852 B2 | 4/2010 | Blais |
| 7,769,541 B2 | 8/2010 | Watanabe |
| RE41,983 E | 12/2010 | Wallner |
| 7,894,986 B2 | 2/2011 | Hegedus |
| 8,478,515 B1 | 7/2013 | Foucher et al. |
| 8,549,407 B2 | 10/2013 | O'Neil |
| 8,572,077 B2 | 10/2013 | Dorfman et al. |
| 8,706,415 B2 | 4/2014 | Su et al. |
| 8,712,679 B1 | 4/2014 | Mostofi et al. |
| 8,712,689 B2 | 4/2014 | Courtney et al. |
| 2001/0023476 A1 | 9/2001 | Rosenzweig |
| 2001/0030667 A1 | 10/2001 | Kelts |
| 2001/0037305 A1 | 11/2001 | Mochizuki |
| 2001/0044803 A1 | 11/2001 | Szutu |
| 2001/0056325 A1 | 12/2001 | Pu et al. |
| 2002/0055924 A1 | 5/2002 | Liming |
| 2003/0060973 A1 | 3/2003 | Mathews et al. |
| 2004/0003132 A1 | 1/2004 | Stanley et al. |
| 2004/0260678 A1 | 12/2004 | Verbowski et al. |
| 2005/0004945 A1 | 1/2005 | Cossins et al. |
| 2005/0125143 A1 | 6/2005 | Beesley et al. |
| 2005/0135413 A1 | 6/2005 | Yang et al. |
| 2006/0058951 A1 | 3/2006 | Cooper et al. |
| 2009/0005981 A1* | 1/2009 | Forstall et al. ............ 701/211 |

FOREIGN PATENT DOCUMENTS

| | | |
|---|---|---|
| EP | 0990119 | 11/2005 |
| JP | H9-287964 | 11/1997 |
| JP | H10-13961 | 1/1998 |
| JP | H10-282879 | 10/1998 |
| JP | 2000-197103 | 7/2000 |

(56) References Cited

FOREIGN PATENT DOCUMENTS

| KR | 20000030232 | 6/2000 |
|---|---|---|
| KR | 20000054183 | 9/2000 |
| WO | WO 96/07170 | 3/1996 |
| WO | WO 97/07467 | 2/1997 |
| WO | WO 98/59215 | 12/1998 |
| WO | WO 99/09374 | 2/1999 |
| WO | WO 00/31663 | 6/2000 |

OTHER PUBLICATIONS

Autodesk MapGuide Users Guide, Release 5: Autodesk, Inc.; Jul. 31, 2000; 193 pgs.
"MapInfo Professional User's Guide," MapInfo Corporation: May 31, 2000: 713 pgs. Part 1 and Part 2.
"SDE Version 3.0: Projection Engine," Environmental Systems Research Institute, Inc., ESRI Press; Jun. 19, 1997; 41 pgs.
"SpatialFX Deployment: Server and Enterprise Beans Technology Overview," ObjectfFX Corporation; ObjectfFX Corporation; Aug. 31, 2000; 32 pgs.
"Using MapObjects on the Internet: Map Objects, Internet Map Server"; Environmental Systems Research Institute, Inc.; ESRI Press, 1998; 170 pgs.
"Wireless Solutions with SpatialFX, Any Client, Anywhere," ObjecUFX Corporation; Aug. 3, 2000; 1 pg.
"Understanding ArcSDE: ArcSDE 8," *Environmental Systems Research Institute, Inc. (ESRI)* (1999); 82 pages.
"Using ArcPad: ArcPad 5," *Environmental Systems Research Institute, inc. (ESRI)* (Apr. 24, 2000); 70 pages.
Barclay et al., "Microsoft Terraserver: A Spatial Data Warehouse," *Microsoft Technical Report MS-TR-99-29* (Jun. 1999); 16 pages.
Barclay et al., "Microsoft TerraServer: A Spatial Data Warehouse," Proceedings of the ACM SIGMOD, Redmond, WA, U.S.A. (May 2000); 15 pgs.
Barclay, T., et al., "The Microsoft TerraServer," Microsoft Technical Report: MSR-TR-98-17; June 3D, 1998; 44 pages.
CC-L Claim Chart: Manner and Pertinency of Applying Laurini to Claims 60 and 69 of U.S. Patent No. RE41,983; 11 pages.
CC-M1 Claim Chart: Manner and Pertinency of Applying U.S. Patent No. 6,324,467 to Machii to Claims 69-75 and 77 of U.S. Patent No. RE41,983; 8 pages.
CC-M2 Claim Chart: Manner and Pertinency of Applying U.S. Patent No. 6,324,467 to Machii and Zavoli to Claims 60-68 and 76 of U.S. Patent No. RE41,983; 12 pages.
CC-P1 Claim Chart: Pertinency and Manner of Applying Phelan to Claims 60-66, 68-75, and 77 of U.S. Patent No. RE41,983; 8 pages.
CC-P2 Claim Chart: Pertinency and Manner of Applying Phelan to Claims 67 and 76 of U.S. Patent No. RE41,983; 2 pages.
CC-T Claim Chart: Pertinency and Manner of Applying TerraServer and Oshizawa to Claims 60-77 of U.S. Patent No. RE41,983; 14 pages.
Coleman, D.J.; "Geographical Information Systems in Networked Environments" , John Wiley & Sons, Inc.; Jul. 28, 1999; 15 pgs.
CV No. 11-CV-0639 OMS; Tierravision, Inc.'s Disclosure of Asserted Claims and Preliminary Infringement Contentions, Southern District of California; Aug. 2011, 52 pages.
CV No. 11-CV-2171 OMS; Tierravision, Inc.'s Supplemental Disclosure of Asserted Claims and Preliminary Infringement Contentions, Southern District of California; Oct. 2011, 20 pages.
E1 Claim Chart: Manner and Pertinency of Applying Using MapObjects on the Internet1, Understanding ArcSDE2, and Using ArcPad3 to Claims 60-66, 68-75, and 77 of U.S. Patent No. RE41,983; 14 pages.
E2 Claim Chart: Manner and Pertinency of Applying Using MapObjects on the Internet1, Understanding ArcSDE2, Using ArcPad3, and Gale to Claims 67 and 76 of U.S. Patent No. RE41,983; 2 pages.
Flammia, G., "The Invisible Internet Meets Desktop Applications," IEEE Intelligent Systems; Nov. 1998; 2 pgs.
Fuller, B., et al., "The Magic Project: From Vision to Reality," IEEE Network; May/Jun. 1996; 11 pgs.

G1 Pertinency and Manner of Applying U.S. Patent No. 6,487,495 to Gale to Claims 60-62, 65-71, and 74-77 of U.S. Patent No. RE41,983.
G2 Claim Chart: Pertinency and Manner of Applying U.S. Patent No. 6,487,495 to Gale and Terraserver to Claims 63-64 and 72-73 of U.S. Patent No. RE41,983; 2 pages.
Compton, Jason; Gadgets Galore: Highlights From Spring Comdex Show, Chicago Tribune, Apr. 2000, 2 pages.
Goodchild et al., Distributed Geolibraries: Spatial Information Resources, National Research Council, National Academy Press; Jun. 1999; 136 pgs.
Honeycutt, D., et al., "Geocoding in Arc/Info," ESRI Press, May 26, 1995; 27 pgs.
IEEE Standard Dictionary of Electrical and Electronics Terms, 4th Edition,The Institute of Electrical and Electronics Engineers, Inc., 1988, 3 pages.
Kreller, B., et al., "UMTS: A Middleware Architecture and Mobile API Approach," IEEE Personal Communications; Apr. 30, 1998; 7 pgs.
Laurini et al, "Fundamentals of Spatial Information Systems," *The APIC Series* (1992); 707 pages.
Lee, J., et al., A Web-based Bus Information System: Environmental Systems Research Institute, Inc.; Jul. 28, 1999; 18 pgs.
Matsuyama et al., "A File Organization for Geographic Information Systems Based on Spatial Proximity," Computer Vision, graphics, and Image Processing 26:303-318, Kyoto, Japan (1984); 18 pgs.
Newton, A., et al., "Designing a Scientific Database Query Server Using the World Wide Web: The Example of Tephrabase," Taylor & Francis Ltd.; Apr. 11, 1997; 11 pgs.
Office Action in Inter Partes Reexamination dated Jan. 7, 2012; 126 pages.
O'Leary, Mick; "MapQuest and Maps on Us: Top Web Map Services," Consumer Online, Oct. 31, 1997; 3 pgs.
O'Rafferty et al., "A Rapidly Configurable Location-Aware Information System for an Exterior Environment", PRISM, Dept. Of Computer Science, University College Dublin (UCD), Dublin 4, Ireland, pp. 334-336, 1999.
Peterson, John; "SpatialFX: Technology Overview," ObjecUFX Corporation, 1998; 28 pgs.
Peterson, John; "SpatialX:Technology Overview," ObjecUFX Corporation, 1998; 48 pgs.
Potmesil, Michael: "Maps Alive: Viewing GeospatialInformation on the WWW," Elsevier Science s.v.: Sep. 30, 1997; 16 pgs.
Preliminary Invalidity Contentions from RIM Oct. 24, 2011, 104 pages.
Preliminary Invalidity Contentions of Google—Claim Chart Index Oct. 24, 2011, 6 pages.
Preliminary Invalidity Contentions of Google Inc. Oct. 24, 2011, 106 pages.
Preliminary Invalidity Contentions of Microsoft Corp—Oct. 24, 2011, 61 pages.
Preliminary Invalidity Contentions of Microsoft Corp Claim Chart Exhibits 1-77; 467 pages.
Reddy, M., et al., "Modeling the Digital Earth in VRML, Technical Note No. 559," SRI International, Nov. 9, 1998; 11 pgs.
Request for Inter Partes Reexamination of U.S. Patent No. RE41,983; 57 pages.
Response after Non-Final Office Action for Inter Partes Reexamination of U.S. Patent No. RE41,983; Filed Mar. 7, 2012; 66 pages.
Sorokine, A., et al., "Interactive Map Applet for Illustrative Purposes," Association for Computing Machinery, Inc., (ACM), Nov. 7, 1998; 8 pgs.
Spivey, Kathy et al., "Untangling the Net—Utility GIS/Internet Technology," AM/FM International: Proceedings Conference; Apr. 26, 1998; 11 pgs.
U.S. Appl. No. 60/160,561; Spatial Server Architecture, filed Oct. 20, 1999.
U.S. Appl. No. 60/176,489; System and Method Providing Location Context Information Using an Electronic Network, filed Jan. 18, 2000.
Volz, S., et al., "NEXUS—Distributed Data Management Concepts for Location Aware Applications," Institute for Photogrammetry, University of Stuttgart; May 25, 2000; 15 pgs.

(56) References Cited

OTHER PUBLICATIONS

Wahl, R., et al., "Prototype Implementation of the NADMSC Draft Standard Data Model, Greater Yellowstone Area," U.S. Geological Survey Open-File Report 00-325: May 17, 2000: 9 pgs.

Wei, Z. et al., "Efficient Spatial Data Transmission in Web-Based GIS," ACM, Nov. 6, 1999; 5 pgs.

Ye, T., et al., "Mobile Awareness in a Wide Area Network of Info-Stations," ACM, Oct. 30, 1998; 12 pgs.

Zavoli et al., "Customer Location Services," *Vehicle Navigation & Information Systems Conference Proceedings* pp. 613-617 (1994); 5 pages.

Patent Local Rule 4.2.A. Joint Claim Construction Chart, *Tierravision, Inc.* v. *Google Inc.*, U.S. District Court, Southern District of California, Case No. 3:11-cv-02170***, 8 pgs.

Patent Local Rule 4.2.B. Joint Claim Construction Worksheet, *Tierravision, Inc.* v. *Google Inc.*, U.S. District Court, Southern District of California, Case No. 3:11-cv-02170***, 7 pgs.

Patent Local Rule 4.2.A. Joint Claim Construction Chart, *Tierravision, Inc.* v. *Research in Motion Ltd.*; Research in Motion Corporation, U.S. District Court, Southern District of California, Case No. 3:11-cv-00639***, 8 pgs.

Patent Local Rule 4.2.A. Joint Claim Construction Chart, *Tierravision, Inc.* v. *Microsoft Corporation*, U.S. District Court, Southern District of California, Case No. 3:11-cv-02171***, 16 pgs.

Housel et al., 1996, WebExpress: a system for optimizing web browsing in a wireless environment, ACM, pp. 108-116.

* cited by examiner

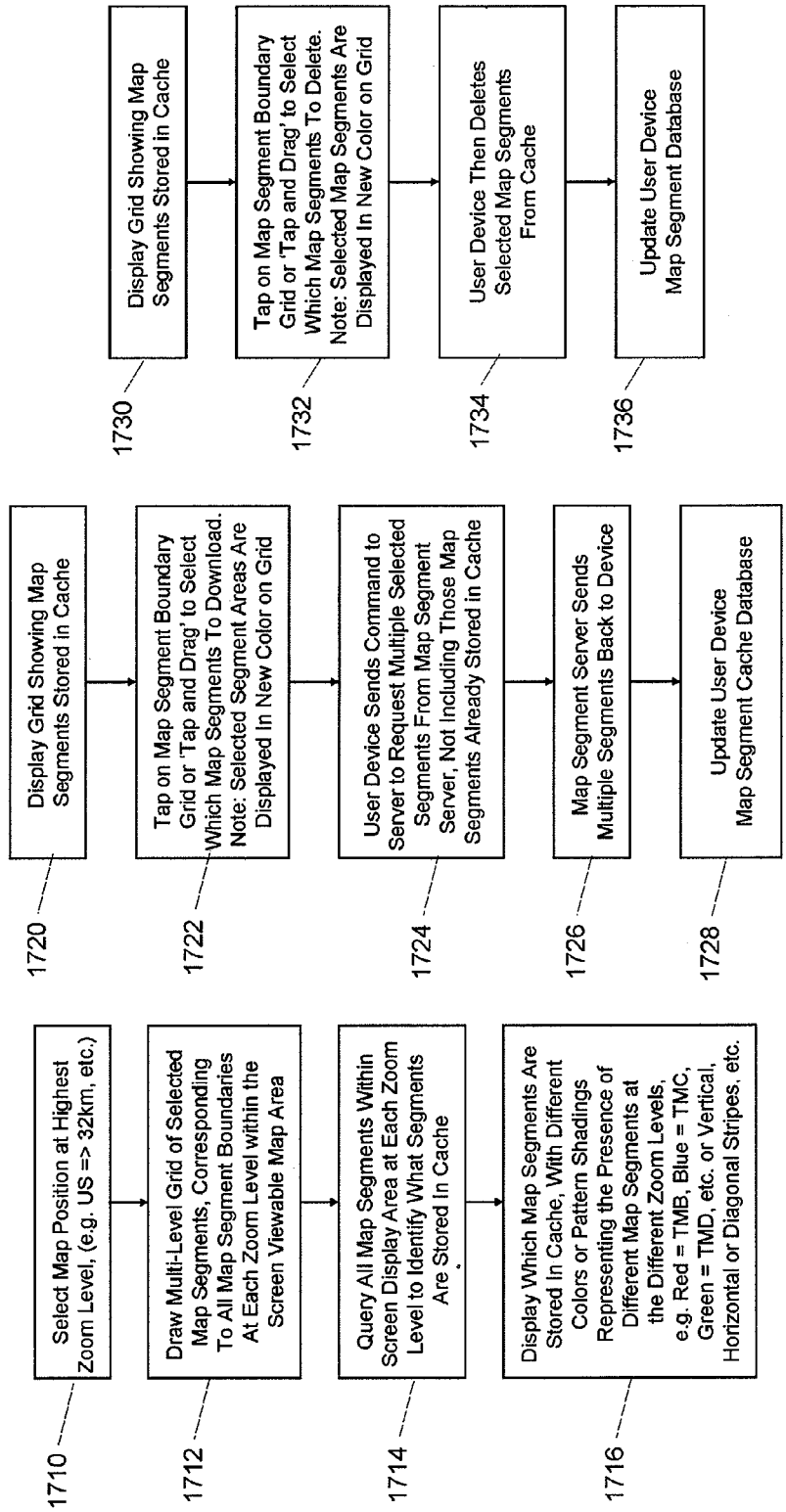

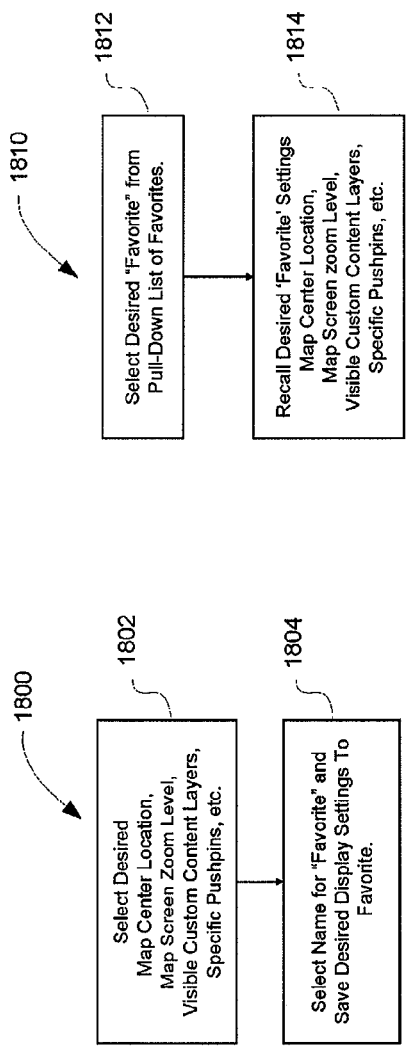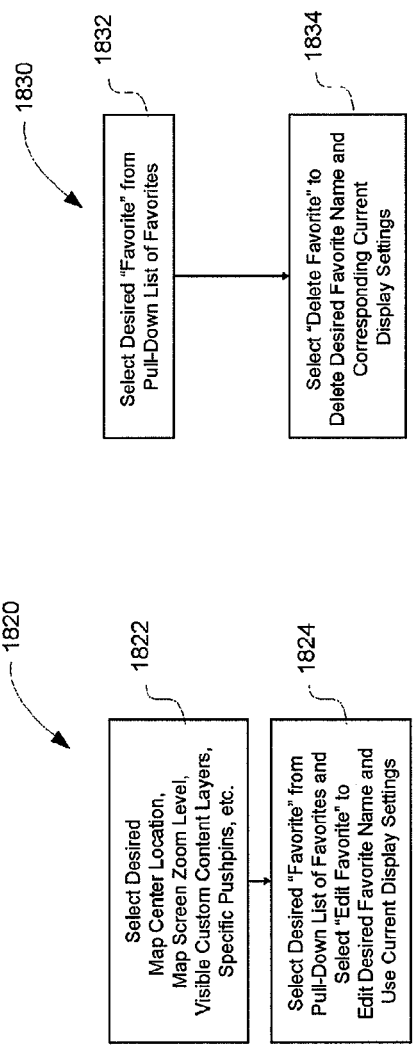
FIG. 18A
FIG. 18B
FIG. 18C
FIG. 18D

SYSTEM AND METHOD OF WIRELESS DOWNLOADS OF MAP AND GEOGRAPHIC BASED DATA TO PORTABLE COMPUTING DEVICES

CROSS-REFERENCE TO RELATED APPLICATIONS

This application is a continuation of U.S. patent application Ser. No. 13/464,654, filed May 4, 2012 (now U.S. Pat. No. 8,649,968), which is a continuation of U.S. patent application Ser. No. 13/185,052, filed Jul. 18, 2011 (now U.S. Pat. No. 8,195,389), which is a continuation of U.S. patent application Ser. No. 12/543,305, filed Aug. 18, 2009 (now U.S. Pat. No. 8,014,945), which is a continuation of U.S. patent application Ser. No. 11/222,208, filed Sep. 7, 2005 (now abandoned), which claims the benefit of U.S. Provisional Application No. 60/607,895, filed Sep. 7, 2004 and U.S. Provisional Application No. 60/627,393, filed Nov. 12, 2004. Each of the aforementioned applications is incorporated by reference in its entirety.

FIELD OF THE INVENTION

The invention relates to management of map data and geographically related content on an electronic device. In addition, the invention relates to sending and receiving map data from and to a mobile electronic device.

BACKGROUND OF THE INVENTION

A variety of electronic devices, such as mobile computers, mobile wireless telephones, global positioning system (GPS) units, personal digital assistants (PDAs), or automobile navigation systems, may provide map display and storage capabilities. In addition, some electronic devices also include software for storing address books, email, Internet browsing, or other applications that generate or organize map data and geographically related content. The term "geographically related content" may refer to any information, e.g., related to a person, place, or object, that has associated geographic references. A "geographic reference" may include a street address, city, zip code, postal code, municipality, region, county, state, province, country, coordinate, latitude, longitude, pseudo-coordinate or geographic index number.

However, a need exists for improved systems and methods of integrating between the map and geographically related content display and storage capabilities of these devices and other software on the devices. Moreover, a need exists for improved systems and methods of communicating, or downloading, map data and geographically related content to and from such devices.

SUMMARY OF THE INVENTION

The system, method, and devices of the invention each have several aspects, no single one of which is solely responsible for its desirable attributes. Without limiting the scope of this invention, some of its more prominent features will now be discussed briefly. After considering this discussion, and particularly after reading the section entitled "Detailed Description of Certain Inventive Embodiments" one will understand how the features of this invention provide advantages that include sharing of geographically related data.

One embodiment is a method of processing geographically referenced content comprising geographical coordinate data in a portable computing device. The method includes receiving, from a first source, geographically referenced content comprising geographic coordinate data. The method further includes receiving a geographic map from a second source. The method further includes storing the received, geographically referenced content in a first portion the data storage. The method further includes storing the geographical map in a second portion of the data storage. The method further includes retrieving the geographical map from the second portion of the data storage based at least in part on a geographical index of the geographical map. The method further includes retrieving geographically referenced content from the first portion of the data storage based at least in part on a geographical index of the geographically referenced content. The method further includes displaying the geographical map on a visual display. The method further includes displaying an icon on the displayed geographical map. The location of the icon on the geographical map corresponds to the geographical coordinate data of the retrieved geographically referenced content.

Another embodiment includes a system for processing geographically referenced content. The system includes means for receiving, from a first source, geographically referenced content comprising geographic coordinate data. The system further includes means for receiving a geographic map from a second source. The system further includes means for storing the received geographically referenced content. The system further includes means storing the geographical map. The system further includes means for retrieving the geographical map from the second portion of the storing means based at least in part on a geographical index of the geographical map. The system further includes means for retrieving geographically referenced content from the storing means based at least in part on a geographical index of the geographically referenced content. The system further includes means for displaying the geographical map and displaying an icon on the displayed geographical map. The location of the icon on the geographical map corresponds to the geographical coordinate data of the retrieved geographically referenced content.

Another embodiment includes a system for processing geographically referenced content. The system includes at least one transceiver configured to receive, from a first source, geographically referenced content comprising geographic coordinate data and receive a geographic map from a second source. The system further includes at least one storage configured to store the received geographically referenced content and store the geographical map. The system further includes a processor configured to retrieve the geographical map from the second portion of the storage based at least in part on a geographical index of the geographical map, and retrieve geographically referenced content from the storage based at least in part on a geographical index of the geographically referenced content. The system further includes a display configured to display the geographical map and to display an icon on the displayed geographical map. The location of the icon on the geographical map corresponds to the geographical coordinate data of the retrieved geographically referenced content.

Another embodiment includes a method of sharing geographically referenced content. The method includes receiving geographically referenced content from a first mobile electronic device for a second mobile electronic device. Each of the first and second mobile electronic devices comprises a wireless communications transceiver. The method further includes sending data identifying the received geographically referenced content to the second mobile electronic device. The method further includes processing a request from the second mobile electronic device for the received geographically referenced content. The method further includes sending the received geographically referenced content to the second mobile electronic device in response to the request from the second mobile electronic device.

Another embodiment includes a network for transmitting data. The network includes a first communications link configured to communicate geographically referenced content between a first and second wireless device. The network further includes a second communications link configured to communicate the geographically referenced content between the second wireless device and a third wireless device. The geographically referenced content comprises geographic coordinate data of a location which is adapted to be selectively displayed as an icon on a map.

Another embodiment includes a method of sharing geographically referenced content. The method includes receiving a request for geographically referenced content from a first mobile electronic device on a second mobile device. The method further includes determining whether the first mobile device is authorized to receive the geographically referenced content. The method further includes sending the requested geographically referenced content to the first mobile electronic device in response to the request.

Another embodiment includes a system for sharing geographically referenced content, The system includes means for communicating with a second mobile electronic device, means for processing comprising means for receiving a request for geographically referenced content from the second mobile electronic device, means for determining whether the first mobile electronic device is authorized to receive the geographically referenced content, and means for the received geographically referenced content to the first mobile electronic device in response to the request.

Another embodiment includes a method of caching map data. The method includes storing a plurality of map segments in a cache. The method further includes associating each of the map segments with a rank. The method further includes updating the rank of at least one of the map segments when the at least one map segment is accessed. The method further includes selecting at least one map segment from the cache to be removed based at least in part on the rank of the at least one selected map segment. The method further includes removing the at least one selected map segment from the cache.

Another embodiment includes system for displaying map data. The system includes means for identifying each of a plurality of geographically referenced contents with an index that is determined based at least in part on geographic coordinates of the respective geographically referenced content, means for displaying a representation of a map comprising a plurality of map segments at a selected zoom level on a display, means for comparing the index of each of the geographically referenced contents to respective indices associated with each of the plurality of map segments, means for selecting at least one of the geographically referenced contents based at least in part on results of the comparing, and means for displaying the at least one of the geographically referenced contents on the display.

Another embodiment includes a method of storing map segments. The method includes storing at least one first map segment representing a geographic area at a first zoom level in a storage. The method further includes storing at least one map segment representing a portion of the geographic area at a second zoom level in the storage. The method further includes displaying the first segment on a display. The method further includes visually representing the portion of the geographic area represented by the at least one stored map segment on the display. The at least one stored map segment is visually represented differently on the display from portions of the geographic area that correspond to map segments at the second zoom level that are absent from the storage.

Another embodiment includes a device for storing and displaying map data. The device includes a storage configure to store at least one first map segment representing a geographic area at a first zoom level and configured to store at least one map segment representing a portion of the geographic area at a second zoom level. The device further includes a display configured to display at least the at least one first segment and to visually represent the portion of the geographic area represented by the at least one stored map segment, wherein the at least one stored map segment is visually represented differently on the display from portions of the geographic area that correspond to map segments at the second zoom level that are absent from the storage. The device further includes a processor configured to control display of the map segments.

Another embodiment includes a method of accessing map data. The method includes receiving a selection of map data from a user interface. The method further includes storing data indicative of the selected map data in association with data indicative of how to display the map data. The data indicative of the map data comprises at least one of a zoom level, a map center location, and at least one map layer to display.

Another embodiment includes a method of accessing preferred map locations. The method includes displaying a list of geographic regions. The method further includes displaying a list of types of geographically referenced content. The method further includes receiving geographically reference content in one of the geographic regions corresponding to at least one of the types of geographically referenced content. The method further includes storing the geographically referenced content and the type of geographically referenced content in association with the one of the geographic regions. The method further includes displaying a list of geographically referenced contents in the one of the geographic regions. The stored geographically referenced content is displayed differently than others of the geographically referenced contents.

Another embodiment includes a method of displaying labels associated with locations on a map comprising a plurality of map segments. The method includes ordering a plurality of locations based on respective ranks of the locations. The method further includes selecting a predetermined number of the locations for display within each of the plurality of map segments based on the order of the ranked locations. The method further includes displaying the selected locations. The predetermined number of locations is based at least in part on the zoom level of the map segments.

Another embodiment includes a system for providing directions on an electronic device. The system includes a display configured to display a map. The display is further configured to display a menu comprising a plurality of geographically referenced contents. The system further includes a input device configured to receive activation of a user interface control associated with at least one of the geographically referenced contents. The system further includes a locating determination device configured to determine a location of the system. The system further includes a processor configured to displaying" directions on the display between the location of the system and the at least one of the geographically referenced contents associated with the activated control.

Another embodiment includes a system for creating geographically referenced content. The system includes means for receiving a selection of displayed text comprising an address, means for identifying geographic coordinates associated with the address, means for generating geographically referenced contents associating the address with the geographic coordinates, and means for storing the geographically referenced contents.

Another embodiment includes system for identifying a portion of a map on a display. The system includes means for associating each of a plurality of regions of the map with a different color, means for displaying each of the regions on the display in the associated color, means for receiving a user selection of a pixel of the display, means for determining the color of the pixel, and means for identifying a selected region of the map by identifying the color of the pixel with the color associated with the selected region.

Another embodiment includes a method of preloading map data. The method includes storing map data on an electronic device. The method further includes determining the location of the electronic device. The method further includes predicting a direction of travel of the electronic device. The method further includes identifying map data along the direction of travel that is absent from the stored map data. The method further includes receiving the identified map data along the predicted direction of travel. The method further includes storing the identified map data.

Another embodiment includes a system for preloading map data. The system includes a storage configured to store map data on an electronic device. The system further includes a device configured to determine the location of the electronic device. The system further includes a transceiver configured to receive map data. The system further includes a processor configured to identify a route of travel of the electronic device, identify map data along the route of travel that is absent from the stored map data, and download the identified map data along the route of travel via the transceiver.

BRIEF DESCRIPTION OF THE DRAWINGS

FIG. 17a is a flowchart illustrating one embodiment of method of indicating the cache status of map segment data.

FIG. 17B is a flowchart illustrating another embodiment of a method of maintaining a cache of map data segments similar to the embodiment depicted in FIG. 17A.

FIG. 17C is a flowchart illustrating a method of providing a user interface for a user manually maintain a cache of map data.

FIGS. 18A-D are flowcharts that illustrate embodiments of methods of manipulating favorites.

DETAILED DESCRIPTION OF THE PREFERRED EMBODIMENT

The following detailed description is directed to certain specific embodiments of the invention. However, the invention can be embodied in a multitude of different ways as defined herein. In this description, reference is made to the drawings wherein like parts are designated with like numerals throughout.

Figure 1:
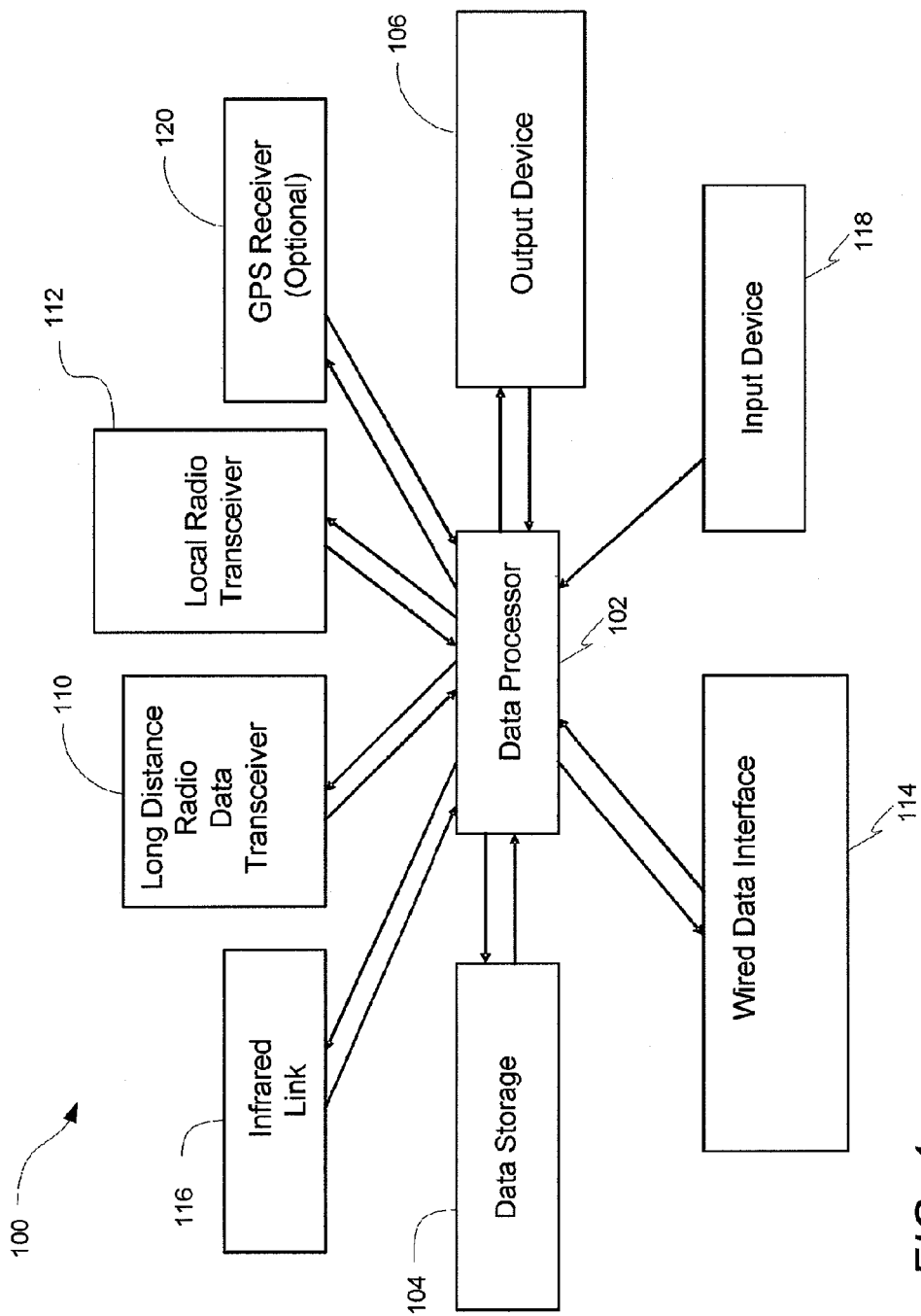
FIG. 1 is a block diagram depicting one embodiment of a networked electronic device.

FIG. 1 is a block diagram depicting one embodiment of an electronic device 100. The electronic device 100 may include personal computers, servers, mobile computers, mobile telephones, global positioning system (GPS) units, personal' digital assistants (PDAs), or automobile navigation system, or any other suitable type of electronic device. In one embodiment, the electronic device 100 is configured for use by a mobile user.

In one embodiment, the electronic device 100 is associated with a particular user or a vehicle. The device includes a data processor or microprocessor 102, a memory or data storage 104, an output device 106, and one or more input devices 108. The microprocessor 102 may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, an ALPHA® processor, or any other suitable processor. In addition, the microprocessor 102 may be any conventional special purpose microprocessor such as a digital signal processor or programmable gate array.

Memory refers to electronic circuitry that allows information, typically computer data, to be stored and retrieved. Memory can refer to external devices or removable storage systems, for example, disk drives, optical drives, tape drives, or non-volatile memory devices. Memory can also refer to fast semiconductor storage (chips), for example, Random Access Memory (RAM) or various forms of Read Only Memory (ROM), that are directly connected to the processor or removably connected to the processor. Removably connected memory may include memory on any standardized or proprietary device such as a memory card, a secure digital memory card, a memory stick, or any other suitable removable memory device. In one embodiment, the memory 104 is a hierarchical memory model that includes, for example. a secondary cache memory of faster memory. e.g., SRAM and a main memory. which may be a slower memory, e.g., DRAM. In one embodiment, the memory 104 includes solid state persistent memory such as FLASH memory or magneto resistance RAM (MRAM). In one embodiment, the memory 104 includes a disk drive, e.g., a magnetic. optical, or magneto-optical drive.

The output device 106 may include one or more video and audio output devices, such as a display screen, a printer, or a voice synthesizer. The display screen may be any visual display device such as a liquid crystal display (LCD), a cathode ray tube (CRT). plasma, OLEO (Organic Light Emitting Diode), or any other suitable display device. The output device 106 may include devices such as loudspeakers for producing sounds. In one such embodiment, the audio output device 106 may include a vibrator device or other device configured to provide a relatively inaudible signal to a user.

The input devices 108 may be a keyboard, rollerball, pen and stylus, mouse, multidirectional navigation button, or voice recognition system. The input device 108 may also be a touch screen associated with the output device 106. The user may respond to prompts on the display by touching the screen. Textual or graphic information may be entered by the user through the input device.

The electronic device 100 may communicate with other electronic devices through one or more network interface devices. The network interface devices may include a first wireless transceiver 110. In embodiment, the first transceiver includes a relatively long range data communication interface such as a mobile telephone transceiver, a wireless data transceiver, a satellite data transceiver, or another wireless network interface device. The electronic device 100 may also include a second wireless transceiver 112. In one embodiment, the second transceiver includes a shorter range communications interface including additional radio interface protocols such as Bluetooth, IEEE 802.11, or other wireless protocols. In one embodiment, the second wireless transceiver 112 operates on an unlicensed spectrum band such as 2.5 GHz. In one embodiment, the electronic device 100 also includes a wired data interface 114, such as Ethernet, a serial port, a universal serial bus (USB) port, Firewire, IEEE1394, a synchronization cradle coupled to a network or other computing device, or an interface to a GPS receiver. In one embodiment, the electronic device 100 includes an infrared communications link 116 or an optical frequency data link.

In one embodiment, the electronic device 100 includes a GPS receiver 120 or other device configured to identify at least approximately the location of the device 100. In another embodiment, the electronic device 100 is configured to communicate with an external GPS device 120 through one of the network interface devices such as a serial port embodiment of the wired data interface 114 or through either or both of the wireless data transceivers 110 and 112.

It is to be recognized that embodiments may include only a portion of the components 104-120. For example, certain embodiments may only include a single wireless interface 110 or 112. Another exemplary device 100 may include only a wired interface 114.

Figure 2:
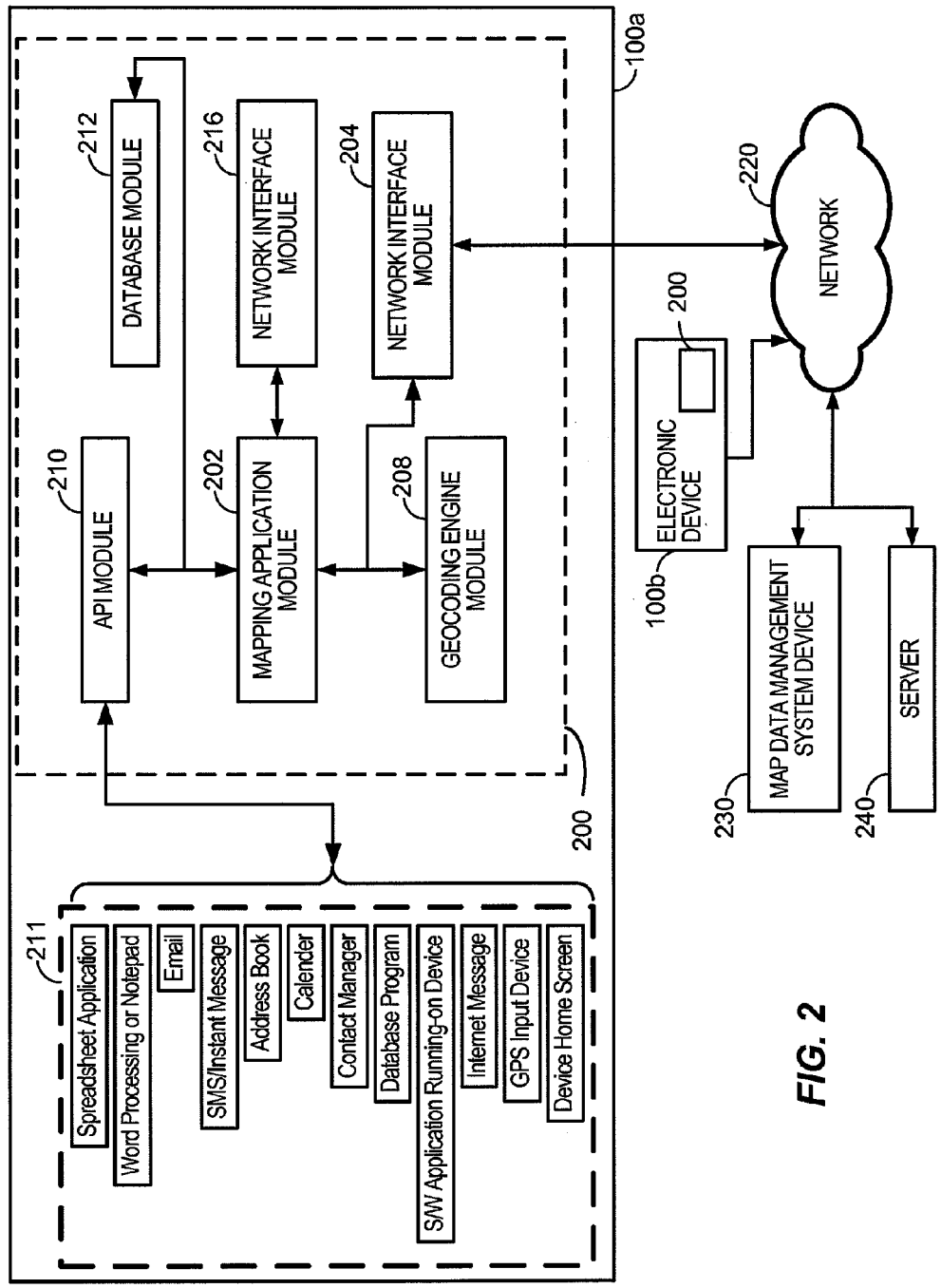
FIG. 2 is a block diagram depicting software modules of one embodiment of a system for managing map data and geographically related content on an electronic device, such as the embodiment of an electronic device depicted in FIG. 1.

FIG. 2 is a block diagram depicting software modules of one embodiment of a system 200 for managing map data and geographically related data on an electronic device, such as the embodiment of a particular electronic device 100a. The system 200 may include various modules 202-212. As can be appreciated, each of the modules 202-212 comprises various sub-routines, procedures, definitional statements, and macros. In one embodiment, each of the modules 202210 is separately compiled and linked into a single executable program. In another embodiment, each of the modules may comprise separate executable programs on the electronic device 100. Thus, the following description of each of the modules 202-212 is used for convenience to describe the functionality of various embodiments of the invention. Thus, the processes that are undergone by each of the modules 210-212 may be arbitrarily redistributed to one of the other modules, combined together in a single module, or made available in a shareable dynamic link library. The functionality and execution of the modules 202-212 may be managed by an operation system (not shown). Further, each of the modules 202212 could be implemented in hardware or located off the device on a server. In one embodiment, one or more of the system modules 200-212 can be located on a network-connected device, such as an Internet server, a remote computer, or an external computing device. An external computing device may be desktop, server, portable, hand-held, set-top, embedded, or any other suitable computing device connected to the electronic device 100 by a network. In particular, the geocoding engine 208 can be located can on a network connected device or an external computing device, which reduces the memory storage requirements for the electronic device 100.

In one embodiment, the system 200 includes a mapping application module 202 that is configured to receive, store, transmit, and manipulate mapping data and geographically referenced content. The mapping application module may communicate with other electronic or computing devices via a network interface module 204. In one embodiment, the network interface module 204 uses one or more of the network interface devices 110, 112, 114, 116, to communicate with a network 220. The network may include any type of electronically connected group of computers including, for instance, the following networks: Internet, Intranet, Local Area Networks (LAN), Wide Area Networks (WAN) or Wireless Local Area Networks (WLAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, embedded or any other desired type of configuration. As used herein, the network includes network variations such as the public Internet, a private network within the Internet, a secure network within the Internet, a private network, a public network, a value-added network, an intranet, and the like.

The network may 220 may provide communication to one or more other electronic devices 230 that also include the map data and geographically referenced content system 200. The geographical map data geographically related content may be transmitted by any suitable data protocol such as Internet Protocol (PI) including application level protocols such SMTP, SMS, 1M, or HTTP. The network 220 may also provide communication with one or more servers 240. In one embodiment, the server 240 is a web server. In other embodiments, the server 240 may respond to any other suitable client-server or peer-to peer protocol. In one embodiment, one or more other electronic devices 100b that include the system 200 are also in communication with the network 220.

Embodiments of the system 200 may include a user interface module 206. In one embodiment, the user interface 206 includes a graphical user interface. The user interface 206 may be output through the display device 106. In one embodiment, the user interface 206 may produce sounds or activate a vibrator device.

Figure 14:
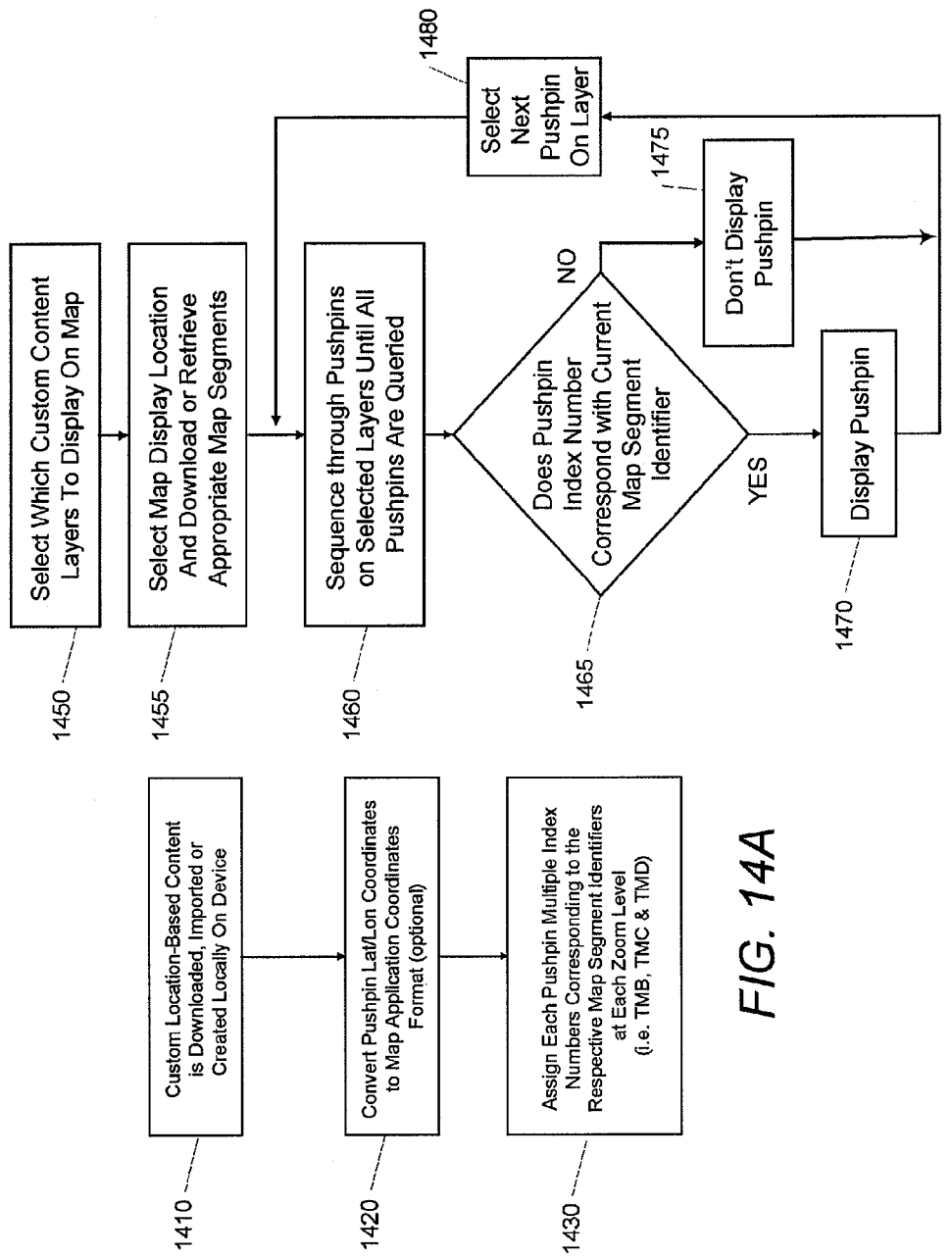
FIG. 14A is a flowchart illustrating one embodiment of a method of determining pushpin index numbers.
FIG. 14B is a flowchart illustrating one embodiment of a method of displaying pushpins based on the pushpin index.

The mapping application module 202 may be configured to interface with a geocoding engine module 208. The geocoding engine module 208 is configured to translate between address data, such as street addresses, and geographic coordinate information, such as latitude and longitude. In one embodiment, the geocoding engine module 208 is configured to translate between different geographic coding systems. For example, in one embodiment, the geocoding engine module 208 is configured to translate between latitude and longitude and another Cartesian coordinate system. In one embodiment, geographically related content includes a geographic index that associates a range of geographic coordinates with a portion of a map. In one embodiment, map data is segmented into data portions that are each associated with a particular geographic index. In one embodiment, the map data may be segmented differently at a number of zoom levels, e.g., in more blocks at more detailed zoom levels and fewer blocks at higher zoom levels. For example, a metropolitan area may be represented by a single map segment at the highest zoom (least detailed) level, in 32 blocks at the next highest zoom level, and in 256 blocks at the lowest (most detailed) level. In one such embodiment, geographically referenced content having geographic coordinates that fall within a particular segment of map data are referenced by the geographic index of that map segment. In one embodiment, geographically referenced content is referenced by geographic indices that identify the map segment and a zoom level of the map segment. One embodiment of a geographic index is discussed in more detail with reference to FIG. 14A. More details of one embodiment of a map coordinate conversion scheme are disclosed in the above incorporated U.S. Pat. No. 6,703,947.

In one embodiment, the mapping application module 202 is configured to communicate with an application programming interface (API) module 210. The API module 210 is configured to interface the mapping application module 202 with other applications or data sources 211 such as an email program, an Internet browser, a web server, a contact manager, or any other software application or information stored, received, or input to the device 100.

In one embodiment, the mapping application module 202 is also configured to communicate with a database module 212. The database module is configured to store, search, and retrieve stored data. In one embodiment, the data is stored in the memory 104. In another embodiment, the database module 212 accesses the data by communicating with a remote database over the network 220.

In one embodiment, the mapping application module 202 is configured to communicate with one or more map and geographic based content servers to download map data and geographic based content as needed. In one embodiment, the mapping application module 202 maintains a local cache or store of map data. This data may be stored by the database module 212. More details of one embodiment of a map caching scheme are disclosed in U.S. Pat. No. 6,703,947, which is hereby incorporated by reference.

Figure 3:
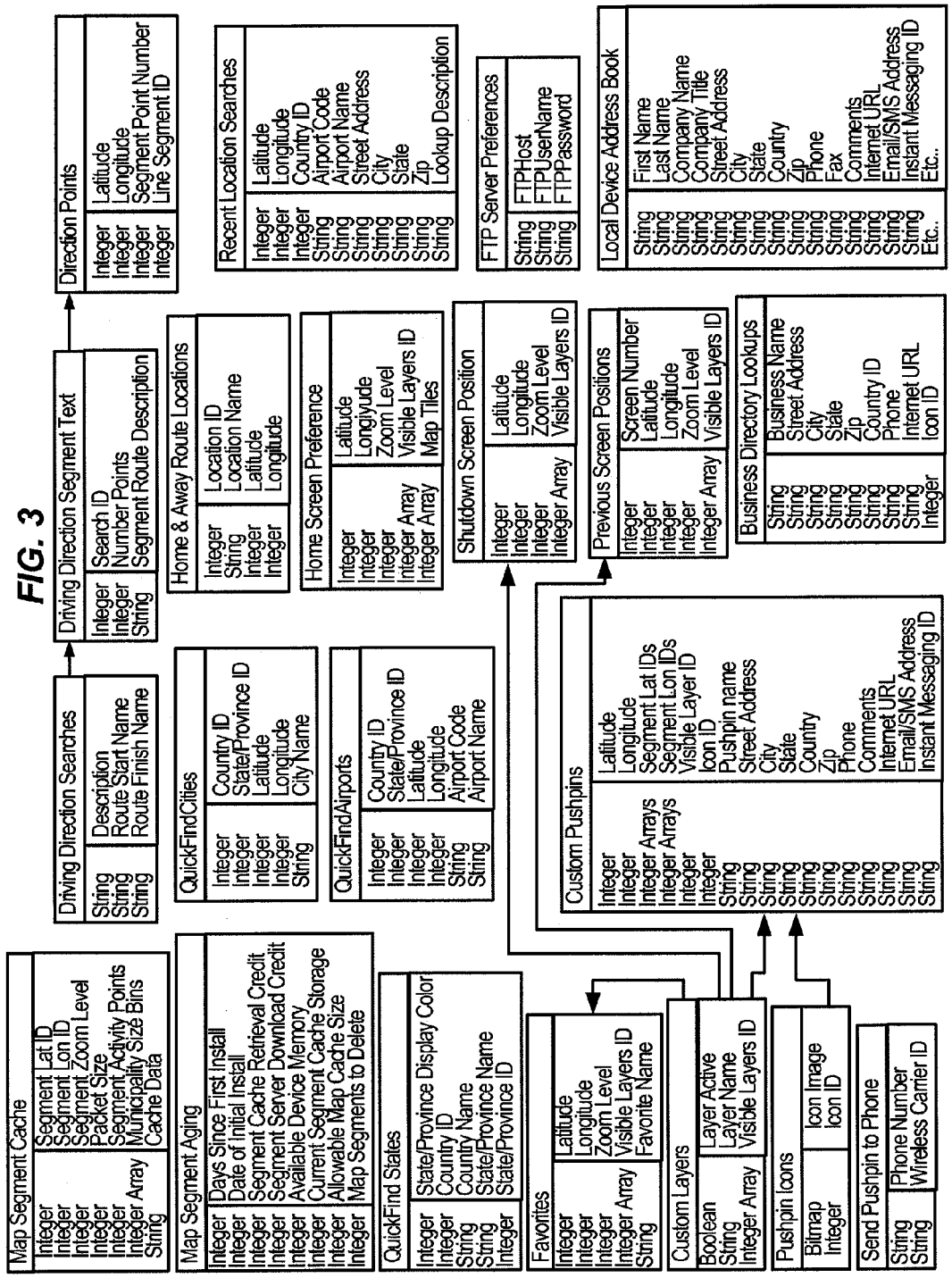
FIG. 3 is a schema diagram illustrating data formats of one embodiment of a system for managing map data and geographically related content such as the system depicted in FIG. 2.

FIG. 3 is a schema diagram illustrating data formats of one embodiment of the system 200. Data in the schema may be stored in a structured database of records, text files, binary data files or other suitable file format. In one embodiment, each schema element is associated with one or more tables in a relational database. More details of the schema elements are described below with reference to embodiments of various methods. In one embodiment, geographically referenced content includes one or more pushpins. Generally, geographically related content such as a pushpin describes a location or object such as an asset, a person, a vehicle, an organization such as a business, a charity, an education institution, governmental entity that is referenced to geographical data. In one embodiment, as illustrated in FIG. 3, a pushpin data element includes geographic location indicators such as latitude and longitude, pseudo-coordinates or geographic location indexes along with fields identifying the pushpin, e.g., a name, street or postal address and other information about the person or object related to the pushpin location. In one embodiment, pushpin data may include other contact data such as hours of operation, personal information about a contact or information about vehicles of the contact.

Various other data items may be associated with pushpins. For example, a displayable layer may be associated with a pushpin. In one embodiment, the mapping application module 202 can be configured to selectively display pushpins that are associated with one or more layers. An icon image for displaying the geographically related content such as a pushpin on a map may also be associated with each pushpin. In one embodiment, the mapping application module 202 can be configured to selectively display' only those pushpins associated with one or more icons images or data identifying an icon, e.g., an icon index. In one embodiment, the mapping application module 202 can be configured to selectively display only those push pins associated with one or more icons images identifiers.

In one embodiment, the mapping application module 202 can be configured to selectively display only those pushpins associated with the particular data values contained in one or more of the data fields associated with a pushpin, such as pushpin name, pushpin comments, pushpin data value, pushpin attribute, address, zip code, municipality, country, location index number, map segment index, coordinate range, phone number, Internet address, email address, user identifier, device identifier, etc.

Embodiments include methods of sending pushpins between one or more electronic devices 100. For example, these methods include sending a message or instruction to a device 100 that includes the system 200. This message or instruction starts the system 200 (if it is not already running in the background) and then displays custom pushpin(s) at the position(s) requested and fills in all the associated the pushpin data fields. The originating device 100*a* sends a message containing the information about the pushpin(s) and the identity of the destination device to the web server 240. The web server then sends a short message system (SMS) or other message or communication to the device telling it that there is a pushpin (or set of pushpins) to be received from the web server 240 and gives the destination device an access code (perhaps consisting of the web server address, user account and a password). The destination device 100*b* then accesses the web server with the user account and access code and downloads the information regarding the pushpin(s).

One embodiment is a method of sending multiple pushpins from an Internet browser so that a user with access to the Internet can send one or more pushpins and associated data to any suitable destination device 100*b*. In one such embodiment, the Internet browser sends the pushpin information and information identifying the destination device to the intermediate web server 240. In one embodiment, the web server 200 then sends a message to the device notifying the destination device that there is a pushpin (or set of pushpins) to be received from the web server 240. In one embodiment, the notification is an SMS message.

It is to be recognized that in other embodiments, the notification message may be sent using any suitable communication protocol, including those discussed herein. The notification message may also include an access code. In one exemplary embodiment, the access code includes the web server address, a user account and a password. The destination device 100*b* then accesses the web server with access code and downloads the information regarding the pushpin(s). In one embodiment, software or hardware on the destination device starts the system 200 if it was not already running. The system 200 can then display the positions of the received push pins.

One embodiment is a method of sending multiple push pins via an intermediate website to other devices. This enables individual users to send their location to a central location register and retrieve the locations of other pushpins within a certain geographic region or with a specific set of search criterion. For example, individual devices 100 may send their pushpin locations and associated information to the intermediate website. Dependent on the location of the device, the intermediate server may send back to the device a set of pushpins within a predetermined geographic area, which meet the desired criteria. As the devices 100 move around, they may update their location, for example, with a frequency based upon the distance moved, including data such as the current map segment index number, the time between location updates, etc.

Other embodiments include methods' of sending multiple location pushpins via a peer-to-peer architecture. Individual users may send their, locations directly to other users and retrieve the locations of yet other pushpins within a certain geographic region, without going through a central server. In one embodiment, users can ask for the location of another specific user and get that information from other users in the network that happen to know where that user is currently. Thus, such embodiments do not include a central database or intermediate server.

Figure 4:
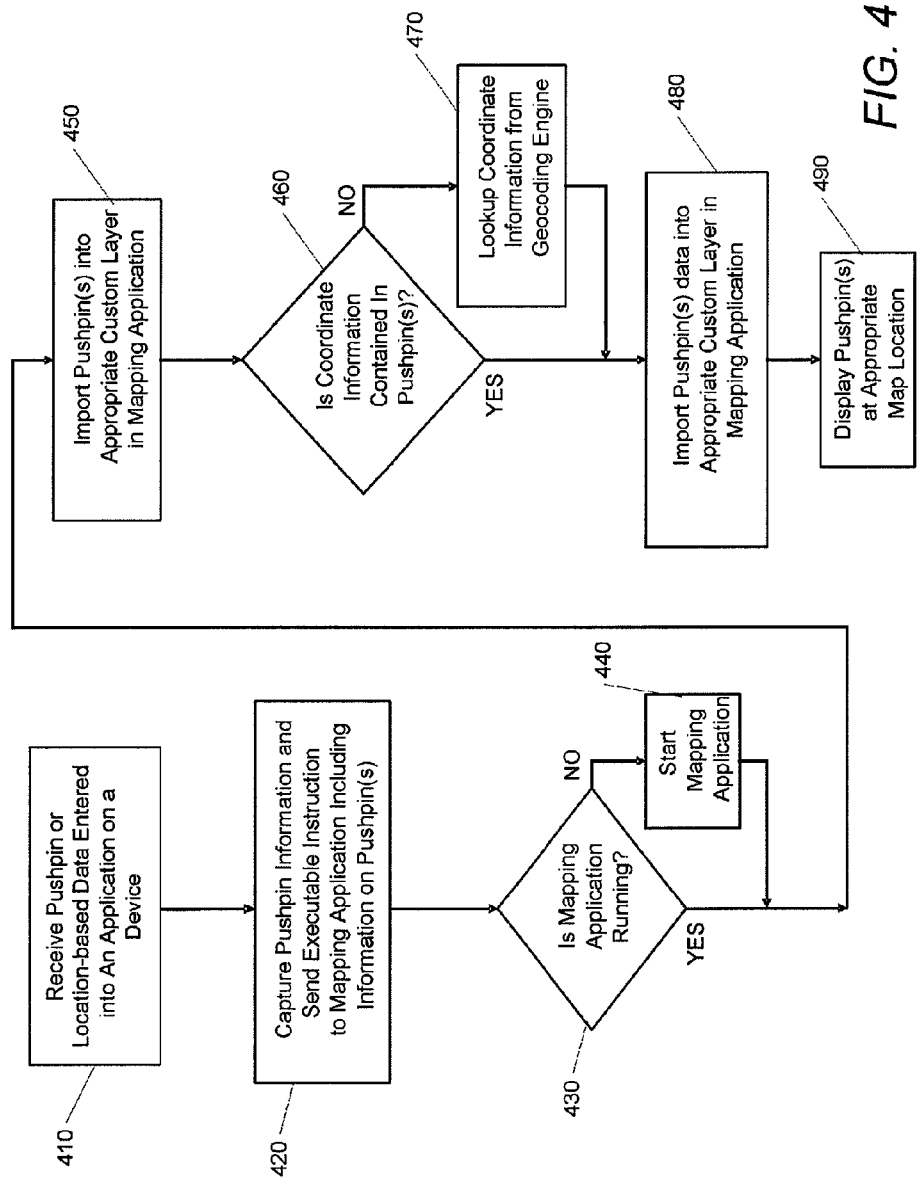
FIG. 4 is a flowchart illustrating one embodiment of a method of communicating a pushpin between applications on the electronic device.

FIG. 4 is a flowchart illustrating one embodiment of a method of communicating a pushpin between applications on the electronic device 100. Beginning at block 410, a pushpin or other geographic based data associated with one or more pushpins is entered or activated on the electronic device 100. Next at block 420, the system 200 captures the location or pushpin information via the API module 210. In one embodiment, another software application on the electronic device 100 sends a message to the system 200 to display the pushpins. In one embodiment, the pushpin message is sent, e.g., as a startup parameter or instruction, to the system 200. In another embodiment, API module interfaces with an interprocess communication (IPC) mechanism such as those provided by operating systems to receive the pushpin message. Next at decision block 430, whether the mapping application module 202 is executing or initialized is detected. If the mapping application module is not executing, it is started at block 440. Next at block 450, the pushpin data, which may include one or more pushpins, is imported into an appropriate displayable layer by the mapping application module 202. The pushpin data may associate a layer identifier associated with the each pushpin. In one embodiment, if no layer identifier is associated with each pushpin, a layer may be selected based on a comparison of predetermined criteria with the existing pushpin data on the device, or based on a set of pre-determined rules about how to associate pushpin data with layer identifiers.

Moving to decision block 460, the pushpin data is checked for coordinate data. If no data is found, the method proceeds to block 470. At block 470, the mapping application module 202 associates coordinate information with the pushpin using the geocoding engine module 206, which may be located in the system 200, on the device 100, or on a remote web server 240. Next at block 480, the pushpin data is imported into the appropriate displayable layers in the database module 212. Proceeding to block 490, the pushpins are displayed using the user interface module 204, e.g., to the display 106.

Another embodiment includes a method of communicating data from the mapping application 202 to another application or data source 211 such as an address or contact manager. In one embodiment, a user selects a pushpin, multiple pushpins, or a layer of pushpins and invokes a user interface, such as a menu button. In one embodiment, the mapping application module 202 sends the pushpin data to another application or data source 211, via the API module 210. In one embodiment, the user interface module 206 provides a control such as a menu item that provides the user with an option to send one or more pushpins and their associated data in a selected map layer to another application or data source 211.

Figure 5:
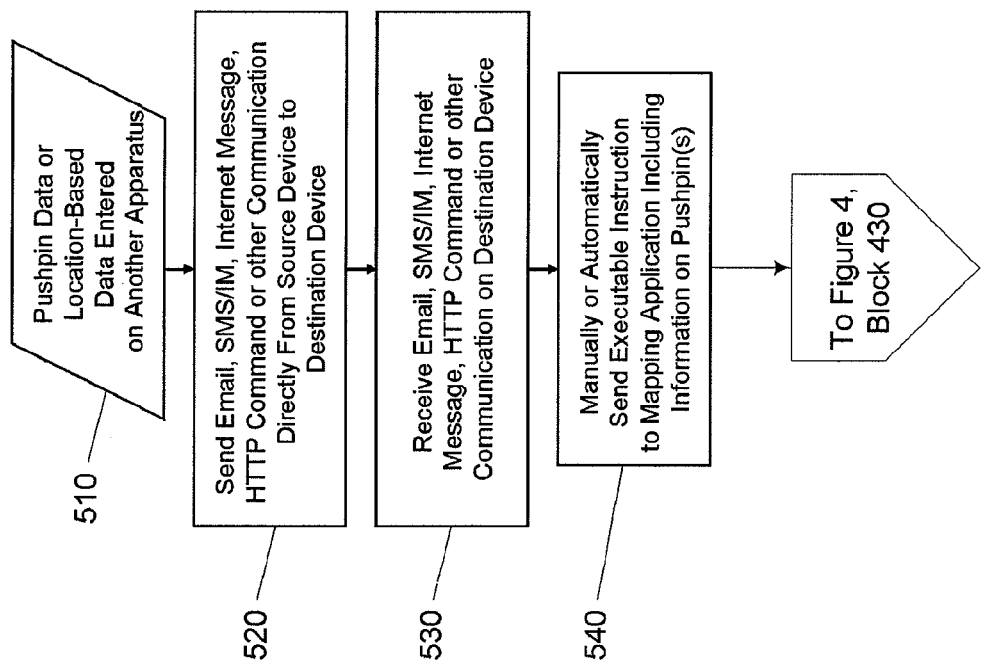
FIG. 5 is a flowchart illustrating one embodiment of a method of communicating pushpin data directly between electronic devices.

FIG. 5 is a flowchart illustrating one embodiment of a method of communicating pushpin data directly between electronic devices 100. Beginning at block 510, pushpin data is entered on a source electronic device 100. Next at block 520, the source device communicates that pushpin data to a destination electronic device 100 via the network 220. The pushpin data may be communicated using any type of electronic communication, including Email.SMS/IM.Internet-Message.an HTTP Command or any other suitable electronic message. Moving to block 530, the pushpin data is received by the system 200 on the destination device 100b. Next at block 540, the system 200 either automatically, or after prompting a user, sends the data to the mapping application. The method then proceeds to block 430 of FIG. 4 and the method continues as described above with reference to FIG. 4.

Figure 6A:
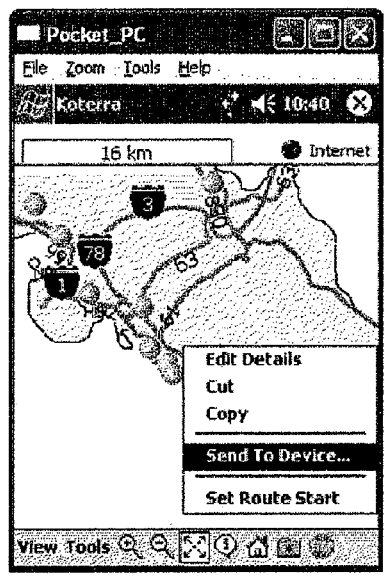
FIGS. 6A-6C are display screen images from the source device 100 illustrating exemplary views associated with entering pushpin data and sending the pushpin data to a destination device as illustrated by FIG. 5.
Figure 6B:
Figure 6C:
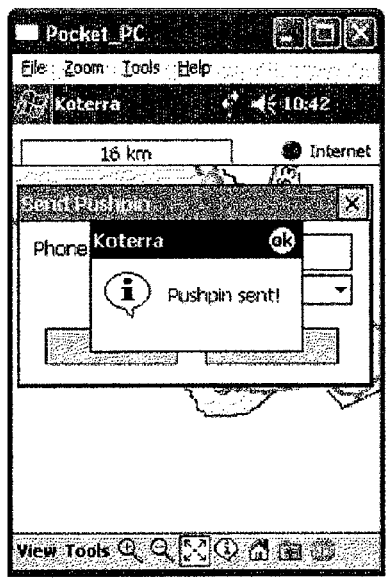
Figure 6D:
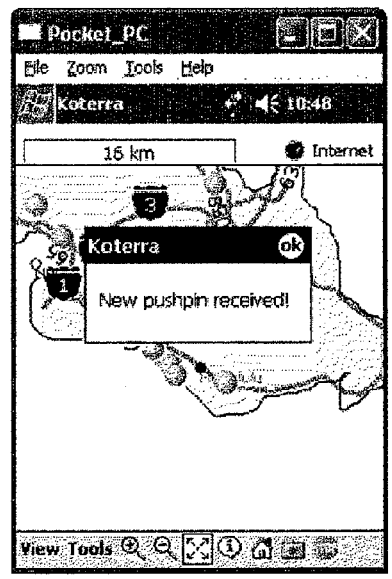
FIG. 6D is a display screen image from the destination device illustrating exemplary views associated with receiving the pushpin data on the destination device as also illustrated by FIG. 5.

FIGS. 6A-6C are display screen images from the source device 100 illustrating exemplary views associated with entering pushpin data and sending the pushpin data to a destination device as described above with reference to blocks 510 and 520 of FIG. 5. FIG. 6D is a display screen image from the destination device 100b illustrating exemplary views associated with blocks 530 and 540 of receiving the pushpin data on the destination device.

Figure 7:
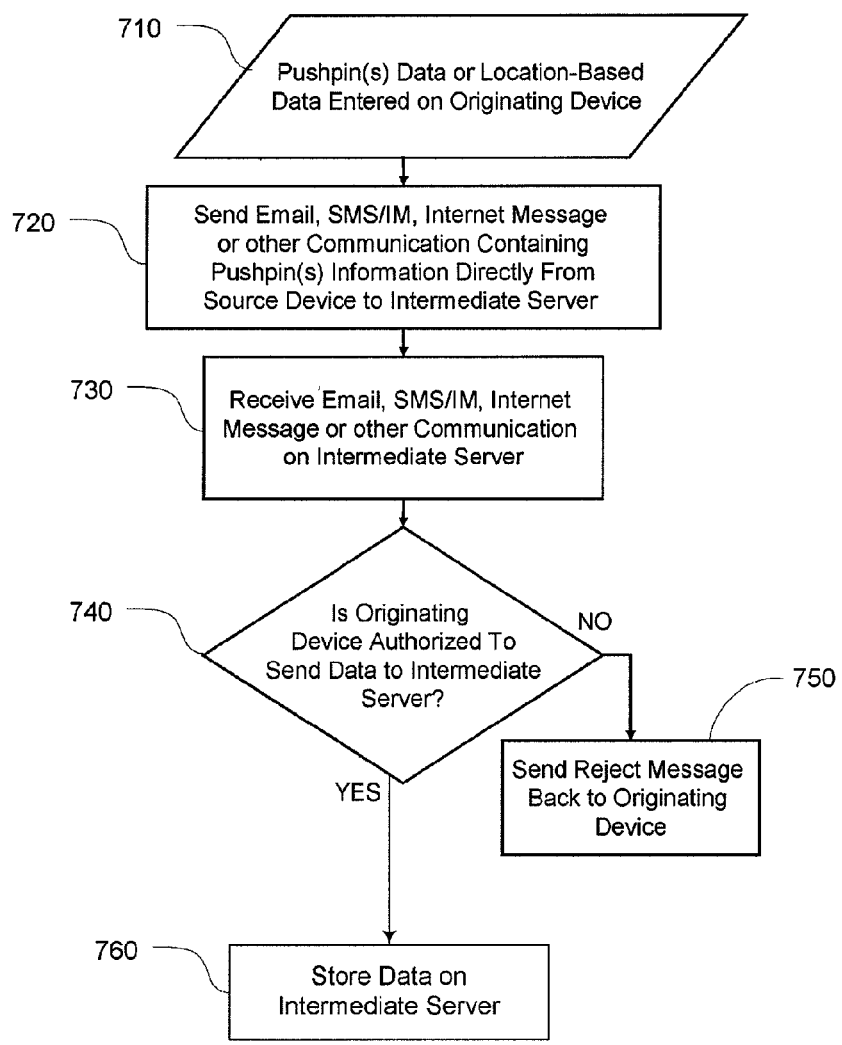
FIG. 7 is a flowchart illustrating one embodiment of a method of communicating pushpin data from an originating device to an intermediate server.

FIG. 7 is a flowchart illustrating one embodiment of a method of communicating pushpin data from an originating device to an intermediate server. In one embodiment, the originating device includes an Internet browser. In one embodiment, the intermediate server may include a web server. In other embodiments, the intermediate server may be any other electronic device 100 that includes the system 200, or modules of the system 200. Beginning at block 710, pushpin data is entered on an originating electronic device 100a or on an Internet browser. Next at block 720, the originating device or Internet browser communicates that pushpin data to the intermediate server via the network 220. The pushpin' data may be communicated using any suitable type of electronic communication, including Email, SMS/IM, Internet Message, or an HTIP Command. Moving to block 730, the pushpin data is received by the intermediate server. Next at decision block 740, the intermediate server determines whether the originating device 100a or Internet browser is authorized to send data to the intended destination device 100b. If the originating device is not authorized to send the message to the destination device, the method proceeds to block 750. At block 750, the intermediate server sends a reject message back to the originating device 100a or originating Internet browser and stops processing the message containing the pushpin data. If the originating device is authorized, the method proceeds to block 760 in which the pushpin data is stored on the intermediate server. In one embodiment, the pushpin data is checked for the presence of geographic coordinate data and then integrated into the appropriate geographic related content database layer by the mapping application module 202 on the intermediate server as described in blocks 460-480 of FIG. 4. If the pushpin data received on the intermediate server does not include the coordinates, then the geocoding engine module 208 in system 200 determines the coordinates and adds them to the respective pushpin data.

Figure 8:
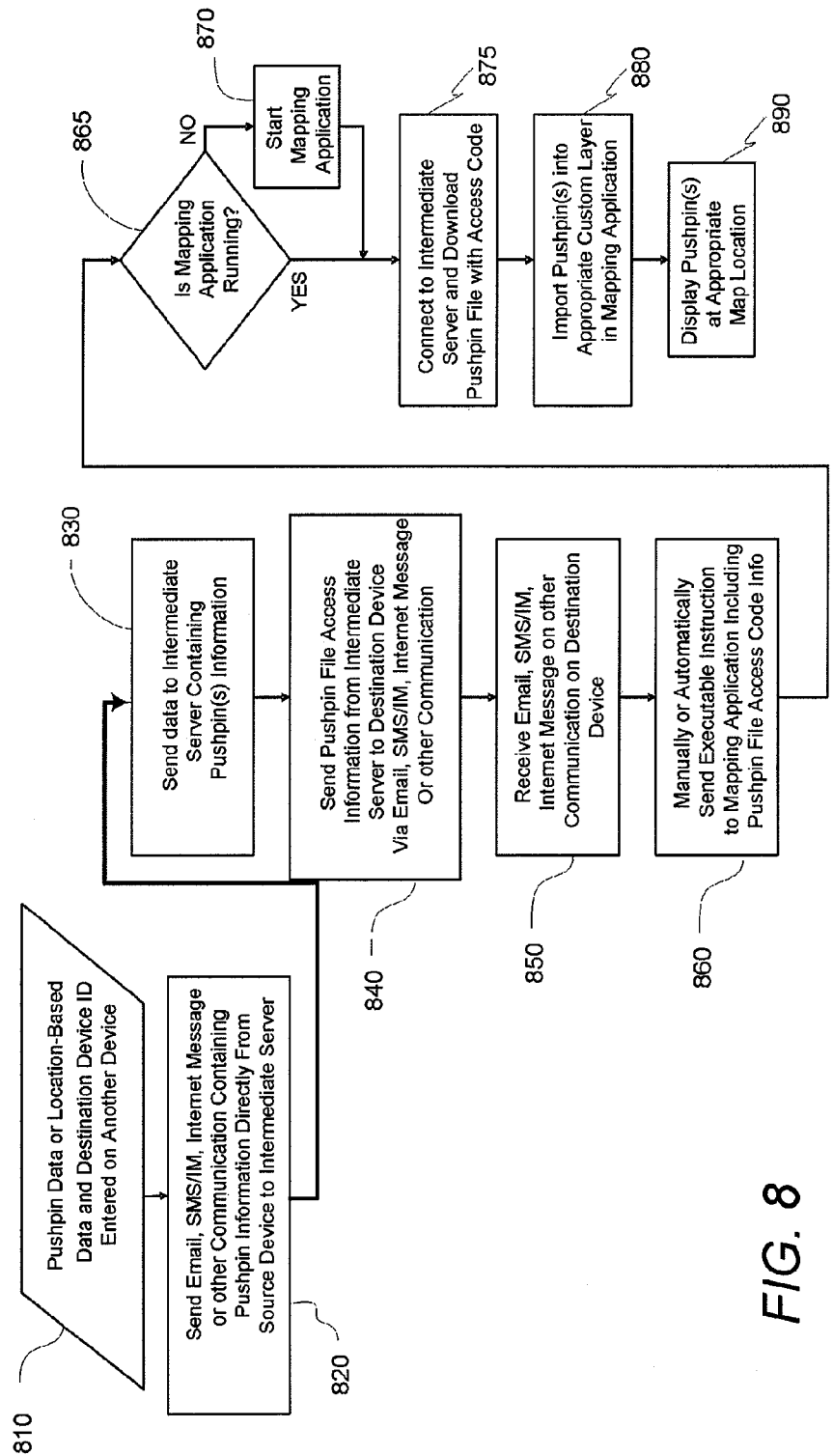
FIG. 8 is a flowchart illustrating one embodiment of a method of communicating pushpin data between electronic devices via the intermediate server.

FIG. 8 is a flowchart illustrating one embodiment of a method of communicating pushpin data between electronic devices 100 via the intermediate server. Beginning at block 810, pushpin data is entered on an originating electronic device 100 or an Internet browser. Next at block 820, the originating device or Internet browser communicates that pushpin data to the intermediate server via the network 220 indicating that the data is destined for a second electronic device 100. The pushpin data may be communicated using any suitable type of electronic communication, including Email, SMS/IM, Internet Message, or an HTTP Command. Moving to block 830, the pushpin data is sent to the intermediate server as described above with reference to FIG. 7. In one embodiment, the pushpin data is stored in a file on the intermediate server. In another embodiment, the pushpin data is stored in a database.

Next at block 840, the intermediate server sends the pushpin file access data or pushpin database access data to the destination device 100b. Moving to block 850, the system 200 receives the intermediate server access data on the destination device 100b. Next at block 860, the system 200 either automatically, or after prompting a user, sends the intermediate server access data to the mapping application module 202. Next at decision block 865, whether the mapping application module 202 is executing or initialized is detected. If the mapping application module is not executing, it is started at block 870. Next at block 870, the mapping application uses the intermediate server access data to authorize retrieval of the pushpin data from the intermediate server. Moving to block 880, the pushpin data is imported into the appropriate custom layers in the mapping application module 202 and stored in database module 212. Proceeding to block 890, the pushpins are displayed using the user interface module 204, e.g., to the display 106.

Other embodiments include methods of an originating device to request pushpins from another destination device 100b or an Internet server. In certain embodiments, these methods include the originating device sending a message or instruction to the system 200 on the destination device 100b to request that the destination device running the system 200 transmit a response message or instruction back to another predetermined location, Internet server or device 100. The response message or instruction from the destination device may contain information for custom pushpins at some location of interest, e.g. the current device location, the future device position, past device position, position of other devices, points of interest, pushpin locations, text message, etc.

The requested pushpin data may be from a number of sources: another application running on the destination device 100b (such as an email or SMS client, address book, calendar, contact manager, database program, enterprise application, inventory control, dispatch, asset tracking, parcel shipping, fleet management, etc.), another device 100 running the system 200, another device running another application (such as an email or SMS client, address book, calendar, contact manager, database program, enterprise application, inventory control, dispatch, asset tracking, parcel shipping, fleet management, etc.), direct input to the device from a command console (e.g. via serial port, USB port, etc.), an Internet browser connecting to a website, a central (location register) website, e.g., as used in ICQ, IM applications, etc., an Internet server, e.g. an FTP server, a map data server, an address lookup server, etc.

As with pushpin data sent by embodiments of the methods described above, the message data sent either from the intermediate server to the destination device 100b or from the originating device 100a may include an Internet command message (e.g. HTTP, ICQ, proprietary Internet message format, etc.), a text file stored on a webpage, a text file stored on an FTP server, an email, an SMS message, or communication directly with the system 200 running on the device, after a remote connection has been established. Pushpin data may include pushpin name(s), e.g. single or multiple pushpin(s), start pushpin, finish pushpin, intermediate stop (waypoint) pushpins, etc., pushpin comments, pushpin icons, pushpin addresses, pushpin appointment times, pushpin location (e.g. coordinates, pseudo-coordinates, etc.), pushpin location index number, pushpin phone number, pushpin Internet address, pushpin email address, pushpin layer, inter-pushpin driving directions text and route segment coordinates or pseudo-coordinates, source device 10 (e.g. IP address, SMS number, email address, phone number, pseudo number/identifier, device 10, user name, vehicle identifier, location identifier, personal identifier, etc.), destination device 10 (e.g. IP address, SMS number, email. address, phone number, pseudo number/identifier, device 10, user name, personal identifier, etc.), or source device message type/format.

Figure 9:
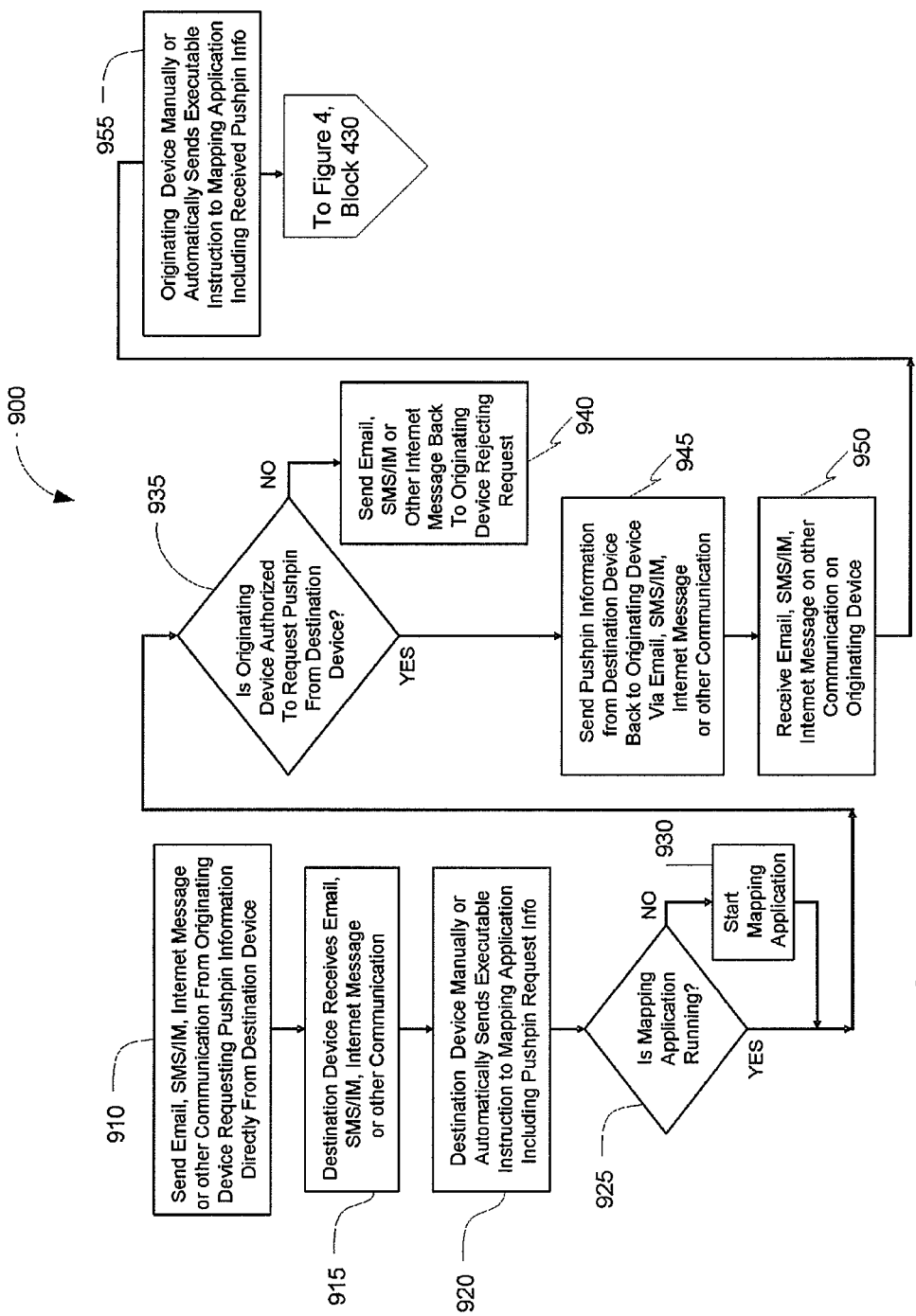
FIG. 9 is a flowchart illustrating one embodiment of a method of requesting pushpin data from another electronic device.

FIG. 9 is a flowchart illustrating one embodiment of a method 900 of requesting pushpin data from another electronic device 100. The method 900 begins at a block 910 in which a message is sent from the originating device to the destination device requesting pushpin data. The message may be sent using a protocol such as email, SMS/IM, or an Internet message. Next at block 915, the system 200 on the destination device 100b receives the request. Moving to block 920, the system 200 either automatically, or after prompting a user, sends the pushpin data request to the mapping application module 202. Next at decision block 925, whether the mapping application module 202 is executing or initialized is detected. If the mapping application module is not executing, it is started at block 930.

Proceeding to decision block 935, the mapping application module 935 determines whether the originating device is authorized to request the pushpin data from the destination device. In one embodiment, the authorization is based on comparing the originating device with a list of devices. In another embodiment, a suitable cryptographic key exchange protocol may be used to determine whether the originating device 100a is authorized. If not, at block 940, a message rejecting the request is returned to the originating device 100a and the method ends. If the originating device 100a is authorized to make a request, the pushpin data is sent in a message from the destination, device 100b back to the originating device 100a. Moving to block 950, the message is received by the system 200 of the originating device 100a. Next at block 955, the system 200 either automatically, or after prompting a user, sends the pushpin data to the mapping application. The method then proceeds to block 430 of FIG. 4 and the method continues as described above with reference to FIG. 4.

Figure 10:
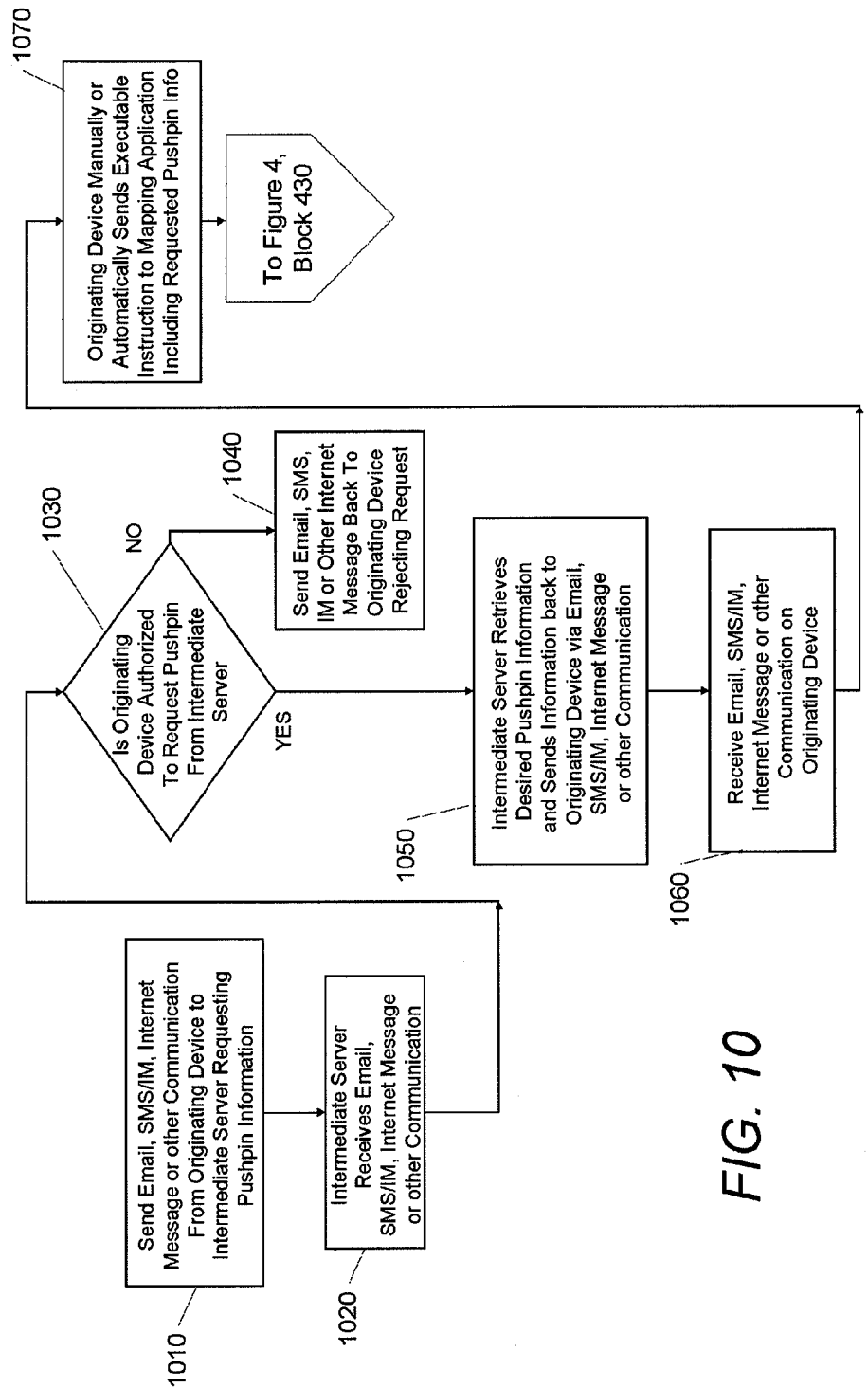
FIG. 10 is a flowchart illustrating one embodiment of a method of requesting a pushpin from an intermediate server.

FIG. 10 is a flowchart illustrating one embodiment of a method of requesting a pushpin from an intermediate server. The method begins at a block 1010 in which a message is sent from the originating device 100a to the intermediate server requesting pushpin information. The pushpin request message may be sent using any protocol such as email, SMS/IM, or an Internet based message. Next at block 1020, the system 200 on the intermediate server receives' the request. Proceeding to block 1030, the intermediate server determines whether the originating device, 100a is authorized to request the pushpin data. In one embodiment, the authorization is based on comparing the originating device with a list of authorized devices. In another embodiment, a suitable cryptographic key exchange protocol may be used to determine whether the originating device 100a is authorized to make a request. If not, at block 1040, a message rejecting the request is returned to the originating device 100a and the method ends. Next at block 1050, if the originating device 100a is authorized, the pushpin data is sent in a message from the intermediate server back to the originating device 100a. Moving to block 1060, the message is received by the system 200 of the originating device 100a. Next at block 1070, the system 200 either automatically, or after prompting a user, sends the data to the mapping application. The method then proceeds to block 430 of FIG. 4 and the method continues as described above with reference to FIG. 4.

Figure 11:
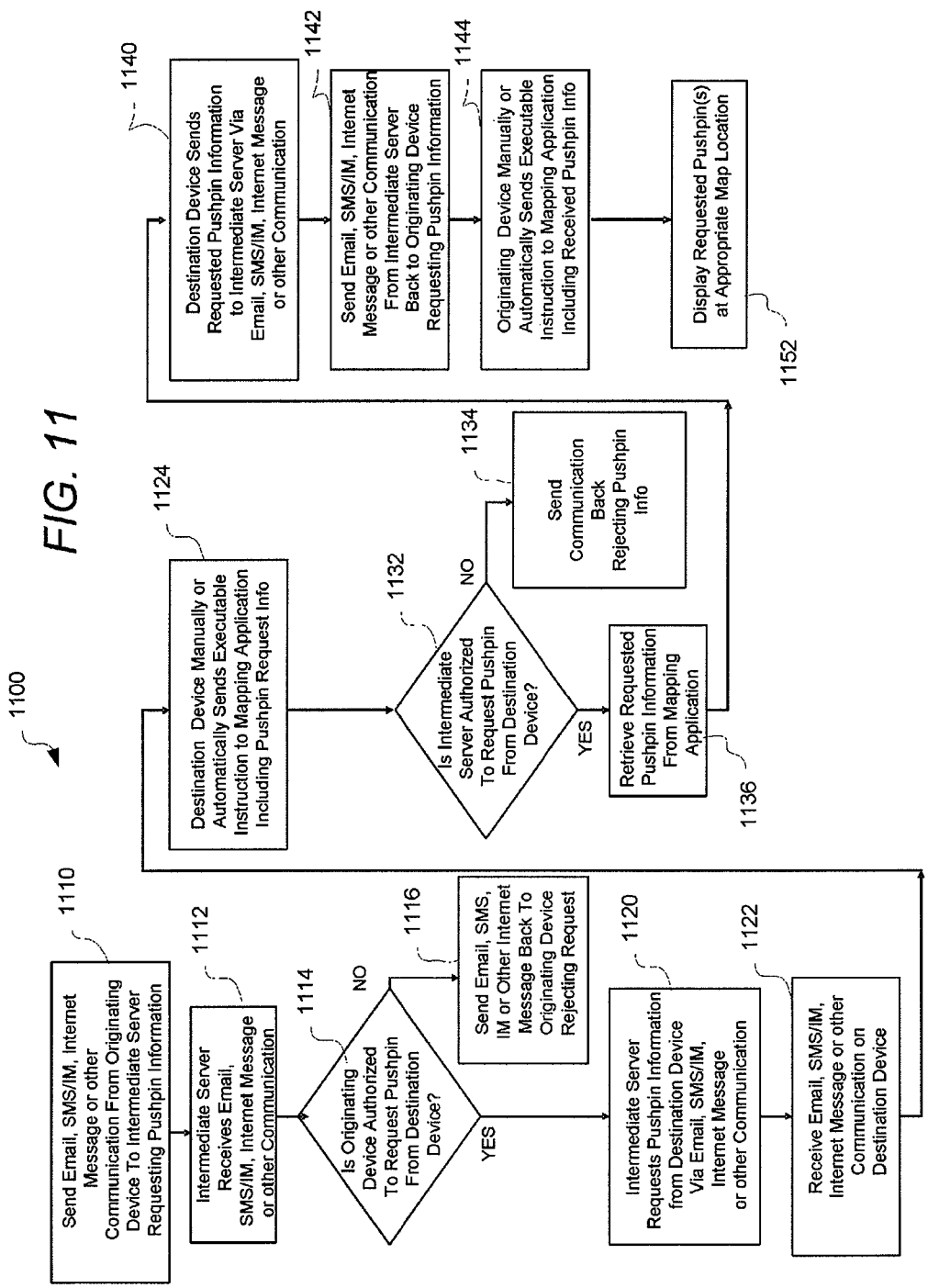
FIG. 11 is a flowchart illustrating one embodiment of a method of requesting pushpin data from another electronic device via an intermediate server.

FIG. 11 is a flowchart illustrating an exemplary method 1100 of requesting pushpin data from another electronic device 100 via an intermediate server. The method 1100 is similar to the method 900 illustrated by FIG. 9 except that an intermediate server receives the request for the pushpin data from the originating device 100a and forwards that request to the destination device 100b and then the intermediate server returns any resulting pushpin data from the destination device back to the originating device 100a.

The method 1100 begins at a block 1110 in which the system 200 sends a communication such as an email, SMS/IM, instant or Internet message from the originating device 100a to the intermediate server 240 to request pushpin information. Next at a block 1112, the intermediate server 240 receives the communication. Moving to block 1114, the intermediate server 240 determines whether the originating device 100a is authorized to request the pushpin from a particular destination device 100b. If the device is not authorized, the method 1100 proceeds to a block 1116 in which the intermediate server 240 sends a communication back to the origination device 100a rejecting the request. The method 1100 then terminates. If the device is authorized, the method 1100 proceeds to a block 1120 in which the intermediate server 240 sends a communication including the request to the destination device 100b for the pushpin information.

Next at a block 1122, the destination device 100b receives the communication containing the request. Proceeding to a block 1124, the destination device 100b sends instructions to the mapping application that includes the pushpin request information. In one embodiment, the system 200 on the device 100b prompts the user to manually instruct the mapping application module 202 to process the request. In another embodiment, the system 200 automatically instructs' the mapping application module 202 to process the request. In one embodiment, the system 200 executes the mapping application if needed.

Proceeding to block 1132, the mapping application module 202 determines whether the intermediate server 1132 is authorized to request pushpin data from the destination device 100b. In one embodiment, the determination is based on a list of authorized servers 240. In another embodiment, the determination is based on a comparison of request data with predetermined criteria established by the user such as the originating device 100a, a user of the originating device 100a, or on portions of the requested pushpin data. If the requestor is not authorized, the method 1100 proceeds to a block 1134 in which the destination device 100b sends a communication back to the intermediate server rejecting the request. If the requestor is authorized, the method 1100 proceeds to a block 1136 in which the mapping application module 202 retrieves the requested pushpin information.

Moving to a block 1140, the system 200 communicates the requested information to the intermediate server 240. Next at a block 1142, the intermediate server 240 communicates the requested pushpin information to the originating device 100a.

Proceeding to a block 1144, the system 200 of the originating device 100 receives the pushpin and either automatically or manually (e.g., by prompting a user via a user interface) provides the information to the mapping application module 202. In one embodiment, the system 200 executes the mapping application if needed. Next at a block 1152, the mapping application module 202, receives the pushpin data and displays it at the appropriate location on a map.

Figure 12:
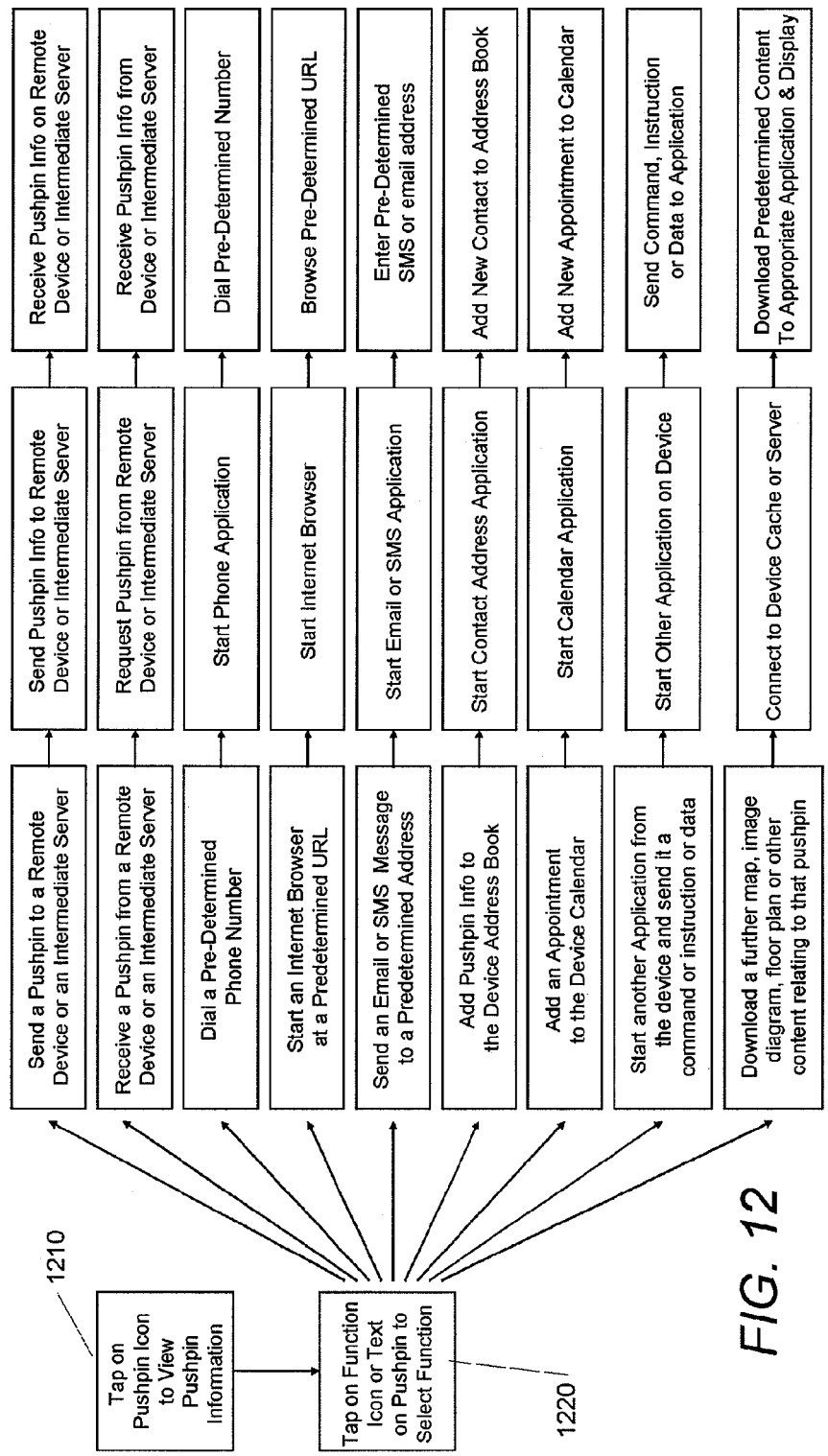
FIG. 12 is a flow diagram illustrating a set of exemplary pushpin commands.

Embodiments also include methods for performing pushpin commands. FIG. 12 is a flow diagram illustrating a set of exemplary commands. The method begins at block 1210, where the system 200 receives an input, for example, tapping on a custom pushpin to activate a menu. Next at block 1220, the system 200 receives a command selection from the menu. Commands may include sending pushpin data and associated information to another device 100 or remote location, dialing a predetermined phone number, starting an Internet browser at a predetermined URL, sending an email to a predetermined location, sending an SMS message to a predetermined address, adding a contact to the address book of the device 100, adding an appointment to the calendar of the device 100, starting another application on the device 100 and send it a command or instruction, or downloading to the device 100 a further map, floor plan, or other content relating to that pushpin, for example.

Another embodiment includes a method of intelligently caching map segments. The method includes intelligently downloading and storing map segments on the, electronic device 100 to ensure that newly requested map segments get downloaded and cached and previously downloaded and cached map segments get retrieved and instantly displayed. In addition, map segments which have not been viewed recently get discarded from the map cache first, map segments which are rarely viewed get discarded first, and segments with low_significance (based on last view date and time and number of views) and lowest zoom level get deleted first, such that the memory available to the device does not tend to get overfilled. Thus, as many map segments are stored as possible on the device and the most relevant map segments are deleted last from the map segment cache. Further, map processing time or processor power can be reduced because only the map segments which are currently being downloaded or retrieved from cache need to have the counters indicating their respective map segment relevancy updated.

Figure 13:
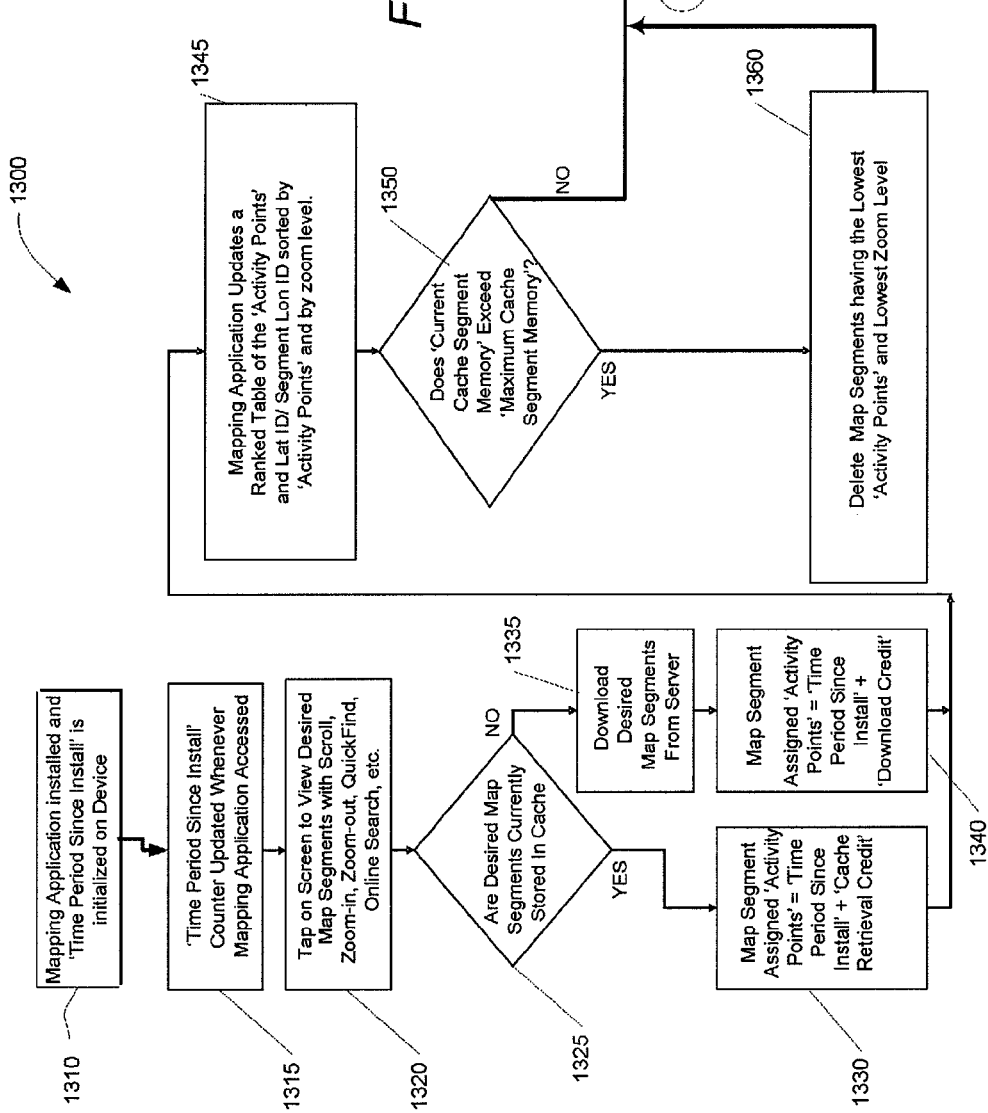
FIG. 13 is a flowchart further illustrating one embodiment of a method of intelligently caching map segments.

FIG. 13 is a flowchart further illustrating such an exemplary method 1300 for managing a cache of map data. The method 1300 begins at a block 1310 when the mapping application module 202 is installed on the device 100 and a counter (e.g., labeled "Time Period Since Install") is created. Next at a block 1315, the counter is updated with the current number of days, or other measure of the time period since installation of the system, whenever the system 200 is started up. Moving to a block 1320, the system 200 is used to view one or more map segments.

At a decision block 1325, the cache is checked for the desired map segments, for each segment not in the cache, the method 1300 proceeds to a block 1335 in which the map segments are downloaded. Next at a block 1340, each downloaded map segment is assigned a number of "Activity Points". In one embodiment, this value is set to be the current "Time Period Since Install" plus some "Download Credit," for example, 365. If a map segment was retrieved from cache at the block 1325, then the method 1300 proceeds to block 1330 in which the number of "Activity Points' assigned to that segment is updated to the current "Time Period Since Install" plus some "Cache Retrieval Credit", for example, 180. Next at bock 1345, the system 200 updates a ranked table containing the map segment identifier and the corresponding number of 'Activity Points', sorted by number of "Activity Points"'. The table may also be sorted by zoom level of the map segments.

Next at a decision block 1350, the system 200 determines whether the "Cached Segment Memory" exceeds a predefined threshold value ("Maximum Allowable Cached Segment Memory") or if overall device memory falls below a threshold. If the thresholds are not exceeded the method 1300 terminates. If the thresholds are exceeded, the method 1300 proceeds to a block 1360 in which the map segments with the lowest number of "Activity Points" gets deleted first, until the "Current Cached Segment Memory" is reduced to a predefined "Nominal Cached Segment Memory" threshold. If multiple segments have the same lowest number of "Activity Points", the system 200 deletes the segments with the lowest zoom level first, i.e., those segments that cover the smallest geographic area. If multiple segments have the same "Activity Points" and the same lowest zoom level then the system 200 deletes the segments with the lowest total (of the 8) adjacent segment "Activity Points". If multiple segments still have equal lowest number of "Activity Points", then the map segments may be deleted one by one in order, until the "Current Cached Segment Memory" is reduced to the predefined acceptable ("Nominal Cached Segment Memory). The method 1300 then terminates.

Another embodiment includes a method of pushpin indexing. The method includes associating each pushpin with a geographic index number or a series of index numbers or identifiers. In one embodiment, these index numbers are used to display only pushpins within the currently retrieved map segments or currently displayed map area or some other predefined geographic region. In one embodiment, the index numbers are used to select pushpins within the currently retrieved map segments or currently displayed map area or some other predefined geographic region for query or download. In another embodiment, pushpins are selected based on being associated with the predetermined identifier. The use of the index number in such embodiments tends to speed the selection and processing of the desired pushpin data and hence speeds the display of the pushpins of interest. In some embodiments, as the map area is updated in cache, the index numbers are used to automatically download, cache, or delete the pushpins for the corresponding map segments in the custom layers which are loaded in cache. The use of geographically based index numbers enormously speeds processing and display when viewing layers with very large numbers of pushpins, e.g. nationwide store locations, real-estate databases, yellow pages, etc.

In one embodiment, the pushpin indexes are calculated according to the equations in Table 1. In the equations below, the values prefixed with TMB, TMC, and TMD refer to indexes at three particular zoom levels in order from highest to lowest zoom level. The equations prefixed by TV are used to convert from Latitude/Longitude coordinates into a positive integer based coordinate scheme. More details of one embodiment of a map coordinate conversion scheme are disclosed in the above incorporated U.S. Pat. No. 6,703,947.

TABLE 1

TV_Lat_Coords = ROUND ((180 − 2 * Latitude)) * 64 * 16000), $$\text{Latitude} = \left(90 - \left(\frac{\text{TV\_Lat\_Coords}}{2*64*16000}\right)\right)$$

TMB_Lat = 180 − (2 * CEILING (Latitude, 1/2)),
    TMC_Lat = 8 * ( (180 − (2 * CEILING (Latitude, 1/16))),
    TMD_Lat = 64 * (180 − (2 * CEILING (Latitude, 1/128)))
    TV_Lon_Coords = ROUND ((360 + Longitude) * 64 * 32000), $$\text{Longitude} = \left(90 - \left(\frac{\text{TV\_Lon\_Coords}}{64*32000}\right) - 360\right)$$

TMB_Lon = 360 + CEILING (Longitude, −1),
TMC_Lon = 8 * (360 + CEILING (Longitude, −1/8)),
TMD_Lon = 64 * (360 + CEILING (Longitude, −1/64))

FIG. 14A is a flowchart illustrating one embodiment of a method of determining index numbers. Beginning at a block 1410, geographically-based pushpin data is downloaded.

Next at block 1420, the pushpin data may be optionally converted from a standard Latitude/Longitude coordinate scheme to the map application's coordinate scheme, such as by using the equations in Table 1 for converting between latitude and longitude and TV_LonCoords and TV_Lat_Coords. Moving to block 1430, the system 200 assigns geographical index values to each pushpin in the map data based on equations such as in Table 1 for calculating indexes in the zoom levels associated with the identifiers TMB, TMC, and TMD.

FIG. 14B is a flowchart illustrating one embodiment of a method of displaying pushpins based on the pushpin index. Beginning at block 1450, map layers are selected for display. Next at block 1455, the map location and associated map segments are downloaded or retrieved from cache. Moving to block 1460, the pushpins in selected layers are queried and pushpins from the result set are individually processed in blocks 1465-1475. Next at decision block 1465, the geographical indexes of each pushpin are compared to the current map segment identifier. If one of the pushpin indexes corresponds to the current map segment identifier, the method proceeds to block 1470, in which the pushpin is displayed. If not, the method moves to block 1475 and the pushpin is not displayed. The method proceeds to block 1480, where the next pushpin is selected for display processing. In an alternative embodiment, rather than being displayed or not displayed in blocks 1470 and 1475, the pushpins are marked for display or non-display, or associated with a list or other data structure of displayed or non-displayed pushpins. In one embodiment, the marked pushpins can then be saved to another geographic content layer, sent to an intermediate server 240 or sent to another device 100.

Figure 15:
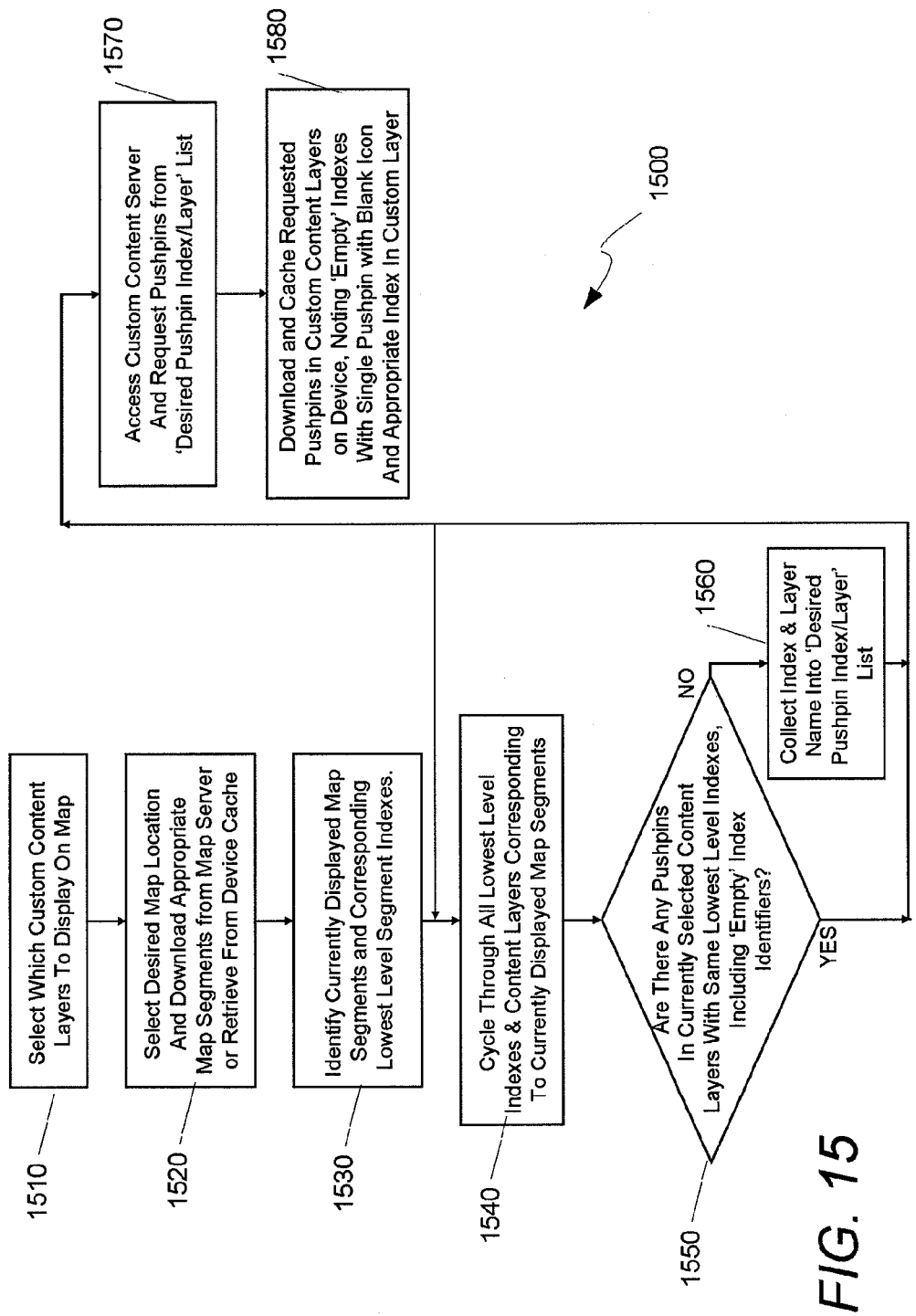
FIG. 15 is a flowchart illustrating one embodiment of a method of downloading pushpin data based on the pushpin index.

FIG. 15 is a flowchart illustrating one embodiment of a method 1500 of downloading pushpin data based on the pushpin zoom level index. In one embodiment, each pushpin is identified with one or more zoom levels by respective indices. In one embodiment, each pushpin is associated with a range of zoom level indices, a lowest level that corresponds to the greatest zoom-in to the map, and a highest level zoom index that corresponds the greatest zoom-out of the map. In one embodiment, a particular pushpin is only downloaded for display if the zoom level of the map corresponds to the zoom level range of the pushpin. The method 1500 begins at block 1510 in which the user or another application selects the content layers to display on the map. Next at block 1520, the corresponding map location is selected and the corresponding map segments are downloaded from a map server or retrieved from the map cache or database on the electronic device 100. Next at block 1530, currently displayed map segments and the segment indexes for the lowest level (e.g., highest zoom-in level) maps are identified. Moving to block 1540, the system 200 cycles through all the pushpin lowest level indices and content layers corresponding to the currently displayed map segments. Next at decision block 1550, each pushpin in cache is examined in the currently selected content layers to determine whether the pushpin has the same lowest zoom level index as any of the currently displayed map segments and their corresponding lowest zoom level map segment indexes. If not, the method proceeds to block 1560 in which the lowest level index and layer name is collected into a list of desired pushpins sorted by lowest level index number and layer name. Next at block 1570, a request is sent to an intermediate 240 server or another device 100 to provide the pushpins in the list of desired pushpins by index/layer. Moving to block 1580, the requested pushpins are downloaded from the intermediate server into custom content layers in the cache of the device 100. In one embodiment, the "empty" indexes for each layer on the intermediate server, (I.e., those indexes where no pushpins for that layer exist) are noted with a single pushpin with a blank icon and the appropriate indexes to act ~s a data sentinel so that the system 200 does not continuously attempt to download pushpin data from the intermediate server for layers and segment indexes which do not contain any pushpins.

Figure 16:
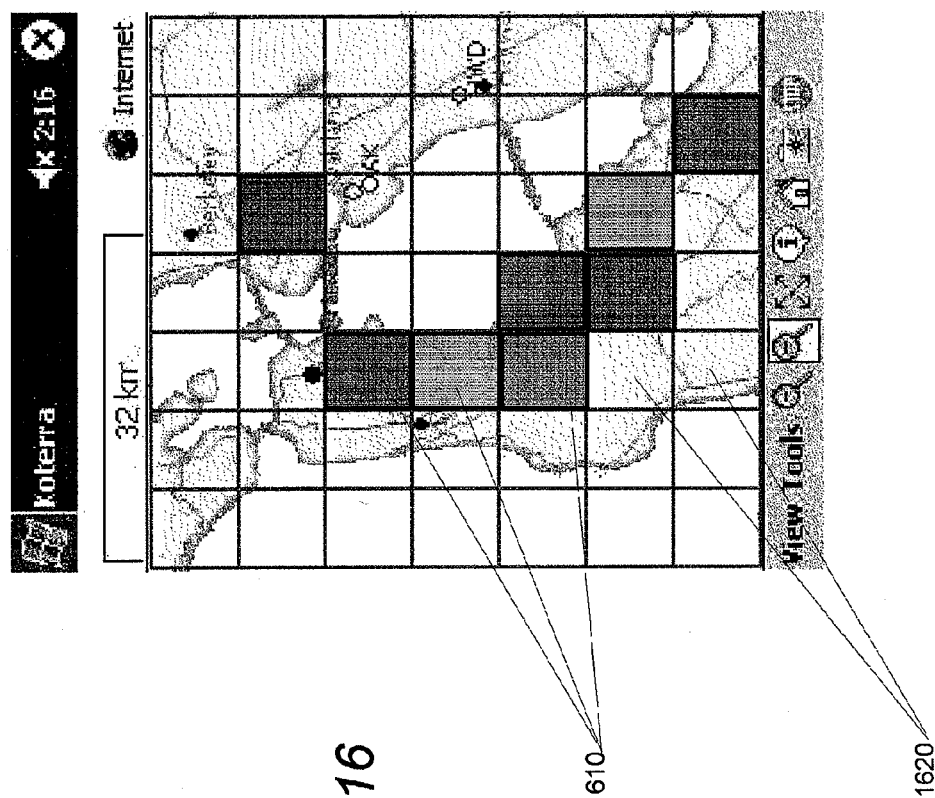
FIG. 16 is a screen shot illustrating exemplary views associated with one embodiment of the method of maintaining a cache of map segments.

Another embodiment includes a method of multiple map segment download and deletion to enable the user to download multiple map segments, inspect what map segments are in cache and to delete one or more of the map segments. The user can thus simply inspect what segments are stored in cache and delete them if required, or if necessary do a large area map pre-installation/download. For example, a user of a device 100 may update the maps installed while it is in a network-connected environment such as in its synchronization cradle or otherwise connected to a network so that the device 100 has maps available for an intended trip in which the device 100 may not always be connected to a network or otherwise have access to a map segment server 230. FIG. 16 is a screen shot illustrating exemplary views associated with one embodiment in which cached segments 1610 are presented in a different color or shading from non-cached segments 1620. FIG. 17a is a flowchart illustrating one embodiment of method of indicating the cache status of map segment data. Beginning at block 1710, the user selects the map of, for example, the, US/Canada (or another smaller geographic area). Next at block 1712, a grid is displayed on the map, corresponding to the geographic boundary of each of the segments at the different zoom levels, e.g. TMB (32 km), TMC (4 km), or TMD (500 m) as disclosed in the above incorporated U.S. Pat. No. 6,703,947. Moving to block 1714, all the map segments within the screen display area are queried to identify which map segments are stored in cache. Next at block 1716, if TMB, TMC or TMD segments are identified as being stored in cache, then various different colors and shading are displayed in the respective grid regions to represent the presence of the respective map segments in the map screen display area at the different zoom levels. Alternatively, the user interface may provide the user with a control to toggle between the different grid and segment sizes (i.e. the different map zoom levels), to display which map segments are stored in cache. Thus, the user may identify the segments in cache at any particular zoom level, by looking at the shaded sizes and colors or just by toggling between the various grid and segment types (i.e., map segment zoom levels).

FIG. 17B is a flowchart illustrating another embodiment of a method of maintaining a cache of map data segments similar to the embodiment depicted in FIG. 17A. Beginning at block 1720, the map grid is displayed as discussed in connection with FIG. 1710. Next at block 1722, after viewing the map, if the user desires to download a large map area from the server, the user can select the segments to download by tapping on or otherwise selecting the respective segment grid. Next at blocks '1724, the mapping application module 20'2 identifies the map segments index numbers (from one or more of the different zoom levels) which are not already stored in cache and requests such segments from the server. In one embodiment, the request to the map server may desirably be performed by a single map data request, rather than asking for the individual map segment data, one segment at a time. Moving to block 1726, the map server sends the requested map segment data to the mapping application module 202, either one segment at a time or as a collection of map segment data. Next at block 1728, the map segment cache 212 is updated to include the additional data.

FIG. 17C is a flowchart illustrating a method of providing a user interface for a user manually maintain a cache of map data. Beginning at block 1730, a grid showing map segments is presented as discussed in connection with FIG. 17A. Next at block 1732, the user taps on the screen display interface module 206 to select map segments to be deleted. Moving to block 1734, the mapping application module 202 deletes the selected map segments from memory or the store of the database module 212. Proceeding to block 1736, the map segment database is updated to reflect the current map cache.

Another embodiment includes a method of storing a particular presentation of a map in a list of favorites. Simply storing a particular map location does not allow a user to conveniently view a map using previously identified desirable settings. A handheld device may be used while walking or driving and may have more limited controls than a desktop computer or similar computing device. Thus, it has been found that it is desirable to provide a user with a simple interface for storing some particular presentations of a map and geographic based content for later viewing. The elements of the presentation that may be saved include the current screen settings, i.e. map center location, zoom level, custom layers, etc. In one embodiment, the user interface module 206 provides an interface for the user to save the current screen settings, i.e. map center location, zoom level, custom layers, etc. by just selecting "Add Favorite" and then the current settings are saved to whatever name is preferred. For example, a 'Favorite' might be named "San Diego Museums," "Toronto Libraries," etc. FIGS. 18A-D are flowcharts that illustrate embodiments of methods of manipulating favorites. FIG. 18A. is a flowchart depicting one embodiment of a method 1800 of creating a favorite via, e.g., user interface module 206. The method 1800 begins at a block 1802 in which a user selects the desired settings data. This data may include one or more of a map center location, a map screen zoom level, a list of visible custom content layers, specific pushpin, or other suitable data. Moving to a block 1804, the user selects a name (or enters a new name) of a favorite. The user interface module 206 receives the selected settings and stores these settings in association with the favorite.

FIG. 18B is a flowchart depicting one embodiment of a method 1810 of selecting and displaying a previously created favorite. The method 1810 begins at a block 1812 in which the user selects a desired "favorite" in a user interface. In one embodiment, the user interface module 206 provides a pull down list of favorites from which the user may select. In other embodiments, the user interface module 206 may provide any other suitable user interface component for allowing the user to select or enter a favorite. Next at a block 1814 the user interface module 206 loads the selected settings data and provides displayed data accordingly. These settings may include one or more of a map center location, a map screen zoom level, a list of visible custom content layers, specific pushpin, or other suitable data.

FIG. 18C is a flowchart depicting one embodiment of a method 1820 of updating the map and presentation associated with a previously created favorite. The method 1820 begins at a block 1822 in which a user selects the desired settings data. This data may include one or more of a map center location, a map screen zoom level, a list of visible custom content layers, specific pushpin, or other suitable data. Moving to a block 1804, the user selects a name (or enters a new name) of a favorite. The user interface module 206 receives the selected settings and stores and updates these settings in association with the favorite.

FIG. 18D is a flowchart depicting one embodiment of a method 1830 of deleting a favorite. The method 1830 begins at a block 1832 in which the user selects a desired "favorite" in a user interface. In one embodiment, the user interface module 206 provides a pull down list of favorites from which the user may select. In other embodiments, the user interface module 206 may provide any other suitable user interface component for allowing the user to select or enter a favorite. Next at a block 1834 the user interface module 206 deletes settings data associated with the selected favorite.

Another embodiment includes a method of displaying a list of preferred locations, such as cities and airports for regions, states, or provinces. In one embodiment, the user interface 206 provides a pull down list of cities and airports that can be found quickly, e.g., a "QuickFind" list. In one embodiment, rather than simply display the list of locations in a particular region or state using a sorting rule, such as alphabetically, the list of locations in a particular region, state, or province may be ordered based on the preferred locations, such as the largest city and main airport that are within that selected region, state or province. Thus, the preferred locations are provided to the user for easier and quicker access to those preferred locations, which are most likely to be selected by the user. In one embodiment, the users quickly select the most likely locations they want to find by selecting the "QuickFind" feature and the desired region, state or province and then the most likely selected (Le. popular) locations are listed first in the pull-down list.

Figure 19A:
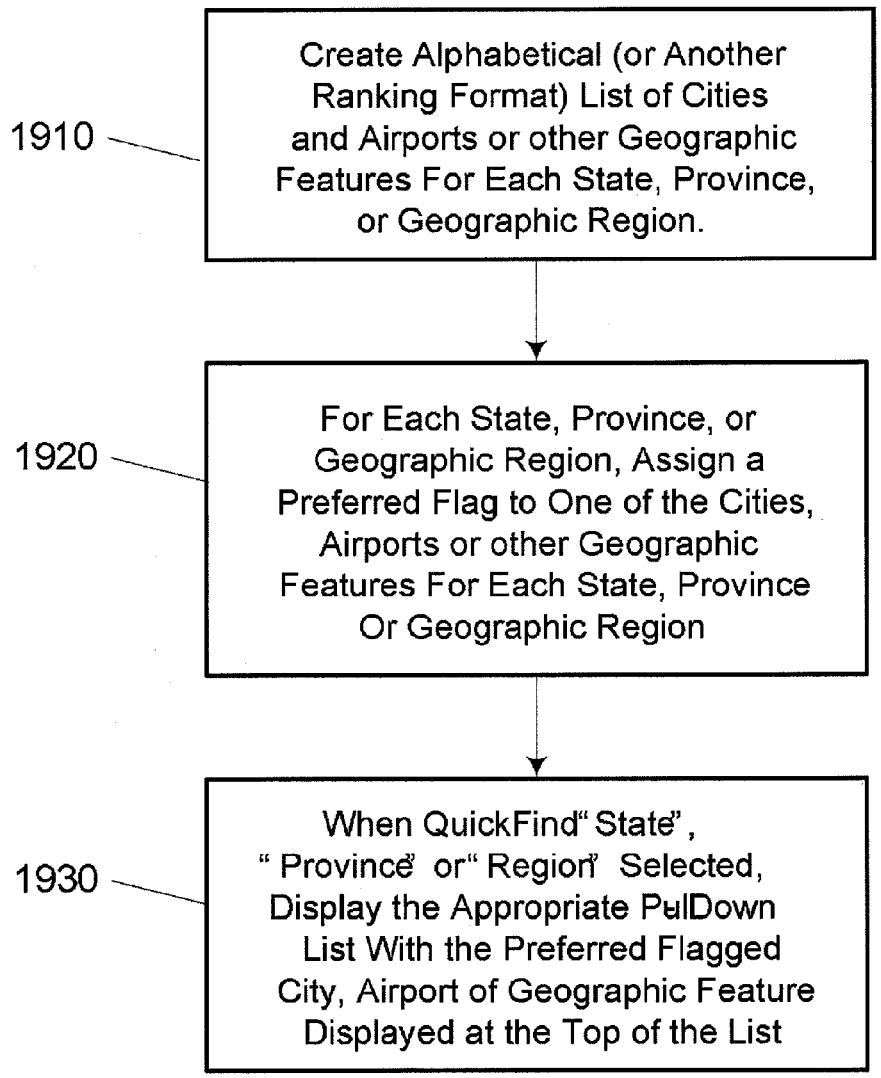
FIG. 19A is a flowchart illustrating one embodiment of a method for creating a list of preferred locations.
Figure 19C:
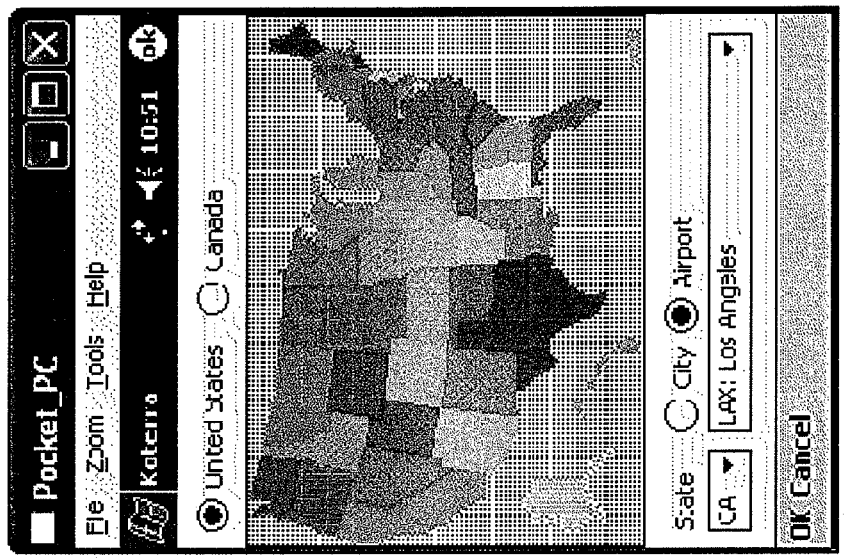
FIG. 19C is a screen shot illustrating exemplary views associated with a user interface for selecting a preferred airport in that region.
Figure 19B:
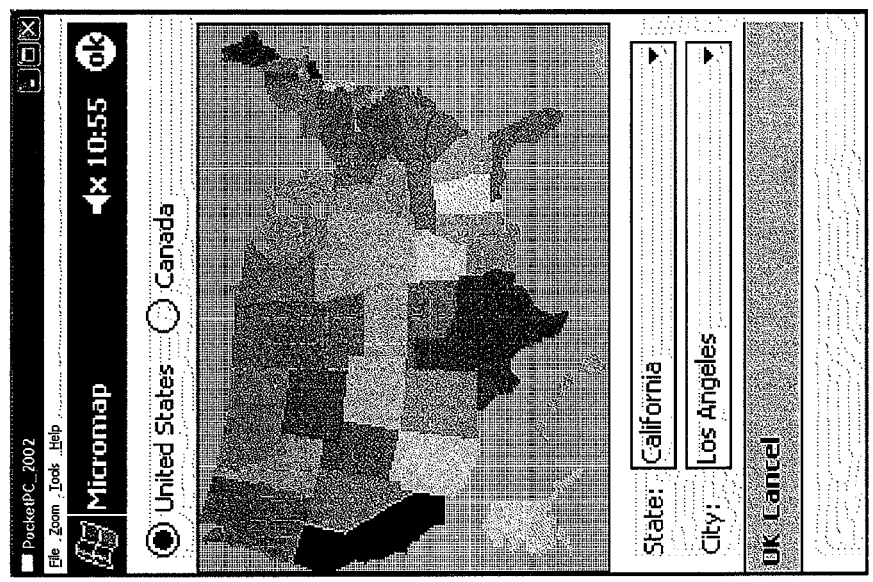
FIG. 19B is a screen shot illustrating exemplary views associated with a graphical user interface for selecting a particular region such as in the embodiment of the method depicted in FIG. 19A.

FIG. 19A is a flowchart illustrating one embodiment of a method for creating a list of preferred locations. Beginning at block 1910, a list of cities, airports, or other geographic points of interest is created in alphabetical (or another sort order) for each state, province, or geographic region. Next at block 1920, a preferred location flag is set for one of the items in the list of preferred locations. For example, FIG. 19B is a screen shot illustrating exemplary views associated with a graphical user interface for selecting a particular region, e.g., the State of California, with Los Angeles selected as the preferred city. FIG. 19C is a screen shot illustrating exemplary views associated with a user interface for selecting a preferred airport in that region, e.g., LAX (Le. Los Angeles Airport). Moving to block 1930, when a "QuickFind" menu for a state, province, or region is presented, the selected preferred locations are displayed at the top of the list. In another embodiment, the selected preferred locations are displayed as the default selection of a menu or other suitable user interface control.

Another embodiment includes a method to display municipality names based on the number of cities and towns and other municipalities within the screen display area. In metropolitan areas, the number of municipalities within the screen area is very high and the screen tends to become cluttered if too many location names are displayed. In rural areas, the number of municipalities is typically lower. In an embodiment in which only cities or towns of a predetermined size or population are displayed, small towns may not be displayed, except at the highest zoom-in levels. It is more desirable when displaying rural areas, to display even the smallest towns. For example, when driving across a desert with no large towns, the display of even the smallest hamlet is helpful for a user to determine position, estimate time of arrival, confirm being on-route, etc.

Figure 20A:
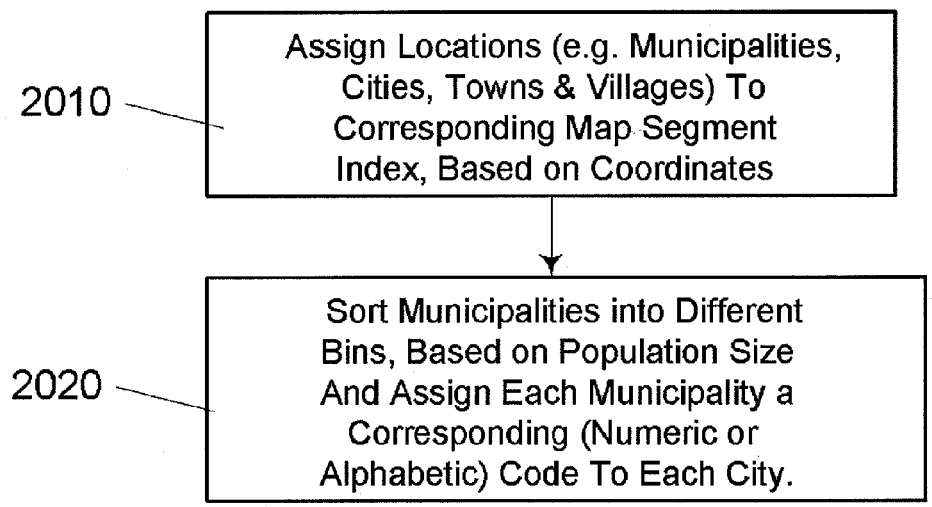
FIG. 20A is flowchart illustrating one embodiment of a method of encoding data to facilitate the display of location names based on the number of locations within the display area.

FIG. 20A is flowchart illustrating one embodiment of a method of encoding data to facilitate the display of location names based on the number of locations within the display area. Beginning at a block 2010, locations, e.g., municipalities such as cities, towns or villages, are assigned map segment locations based on the coordinates of each location. Next at block 2020, the locations are sorted into different bins based on municipality population size for each map segment and at each zoom level. Each location is then assigned a numeric or alphanumeric code or classification based on which population bin to which it is assigned.

Figure 20B:
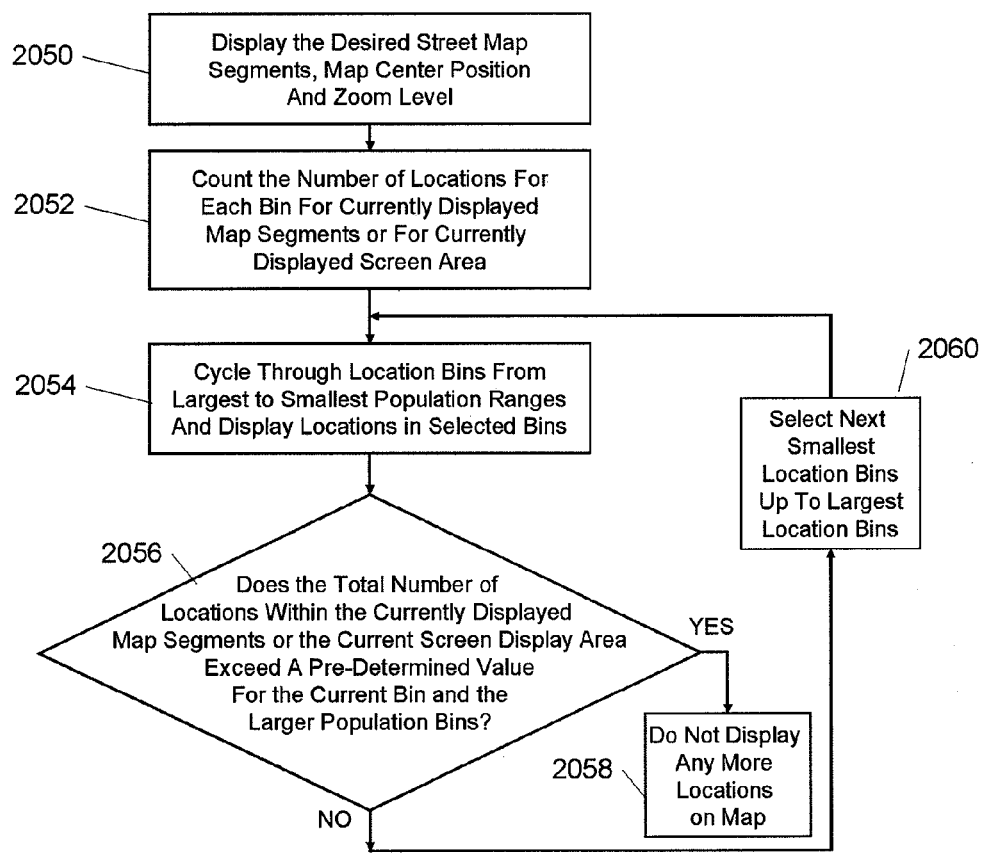
FIG. 20B is a flowchart illustrating one embodiment of a method of displaying location names on a map based on the number of locations within the display area.

FIG. 20B is a flowchart illustrating one embodiment of a method of displaying location names on a map based on the number of locations within the display area. Beginning at block 2050, elements, e.g., streets, highways, highway shields, coastline, water features, etc. of the selected map segments are displayed with the desired map center and zoom level. Next at block 2052, the mapping application module 202 counts the number of locations names in each bin for the currently displayed screen area, based on the numeric or alphanumeric code assigned to each location. Next at block 2054, the mapping application module 202 iterates through the municipality size bins from the largest to the smallest population bins, to display the location names At decision block 2056, the total number of location names within the currently displayed location population bin for all the map segments currently being displayed, is compared to a predetermined number of allowable location names to be displayed for that zoom level. If the threshold for the number of allowable location names to be displayed is exceeded, the method proceeds to block 2058, and no more locations are displayed on the map. If the threshold is not exceeded, the method proceeds to block 2060 where the next smaller location name bin is selected. The method then returns to block 2054 and continues processing the remaining location name bins and the location names for display as discussed above with reference to block 2054.

Figure 21:
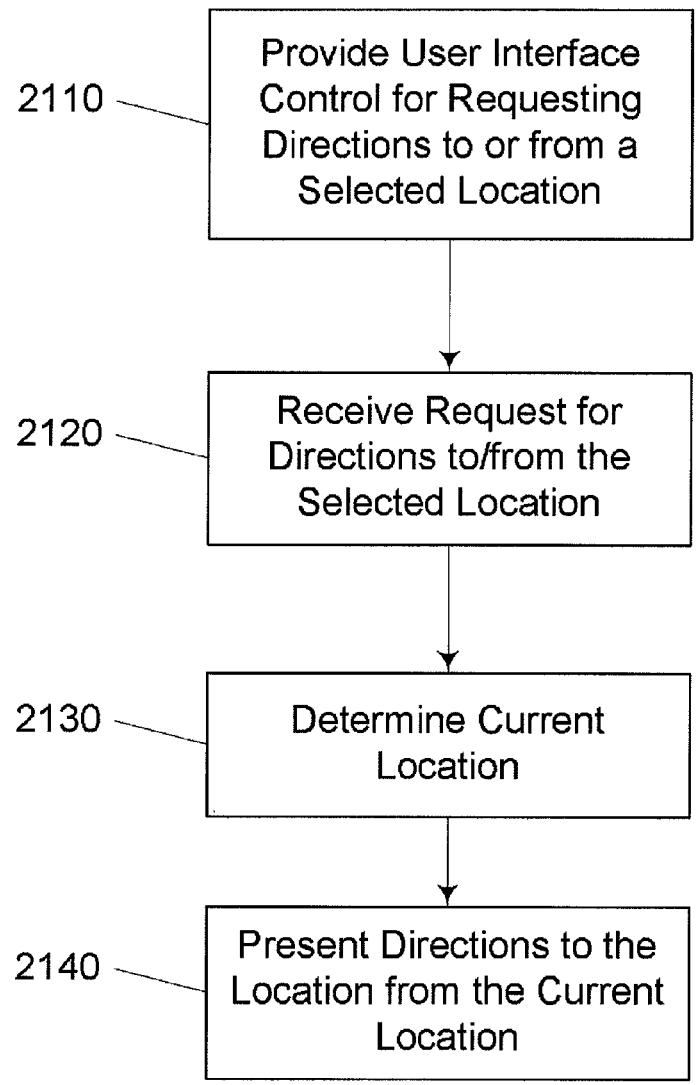
FIG. 21 is a flowchart illustrating an embodiment of a method of providing a user interface for getting driving directions from the current location.

FIG. 21 is a flowchart illustrating an embodiment of a method of providing a user interface for getting driving directions from the current location. Beginning at block 2110, the user interface module 206 is configured to provide a control for accessing directions from the current location to or from a plurality of predetermined locations. In one embodiment, at least one of the pre-determined locations is a default home location, such as determined from other data associated with a user of the electronic device 100. In another embodiment, a user interface is provided for selecting a location from any pushpin data stored on the device. In one embodiment, one or more selected locations are selected and stored as a predefined "preferred" locations (e.g., a "home" and a "work" location). In one embodiment, the control is a menu or other user interface control associated with a pushpin or other location on a displayed map. In another embodiment, the control is a menu or task bar button. Next at block 2120, the user interface module 206 determines that the control has been activated. Moving to block 2120, the mapping application module 202 receives the direction request and determines the current location of the electronic device 100. In one embodiment, the mapping application module 202 communicates with a GPS device to determine the current location. In another embodiment, the mapping application module 202 determines the current device location based on position information received from the wireless mobile communications network 220. Next at block 2140, the mapping application module 202 determines driving directions to/from the current position and the selected position and presents those directions through the user interface module 206.

Another embodiment includes a method of identifying pushpin data from text presented in any application on the device 100. In one embodiment, this functionality is integrated with the system 200 and the geocoding engine module 208 used to associate geographic coordinates or pseudo-coordinates with any pushpins so identified. Associating coordinate or pseudo-coordinate data with pushpins identified from textual addresses or other information produces pushpin data that can be displayed on a map without further processing. This is desirable to allow efficient display of pushpins without having to look up, for example, the coordinates of a large database of pushpins at display time~. Moreover, such pushpins can be displayed on the electronic device 100 even when the device 100 does not include a full map database for geocoding addresses or is out of communication with the network 200.

Figure 22:
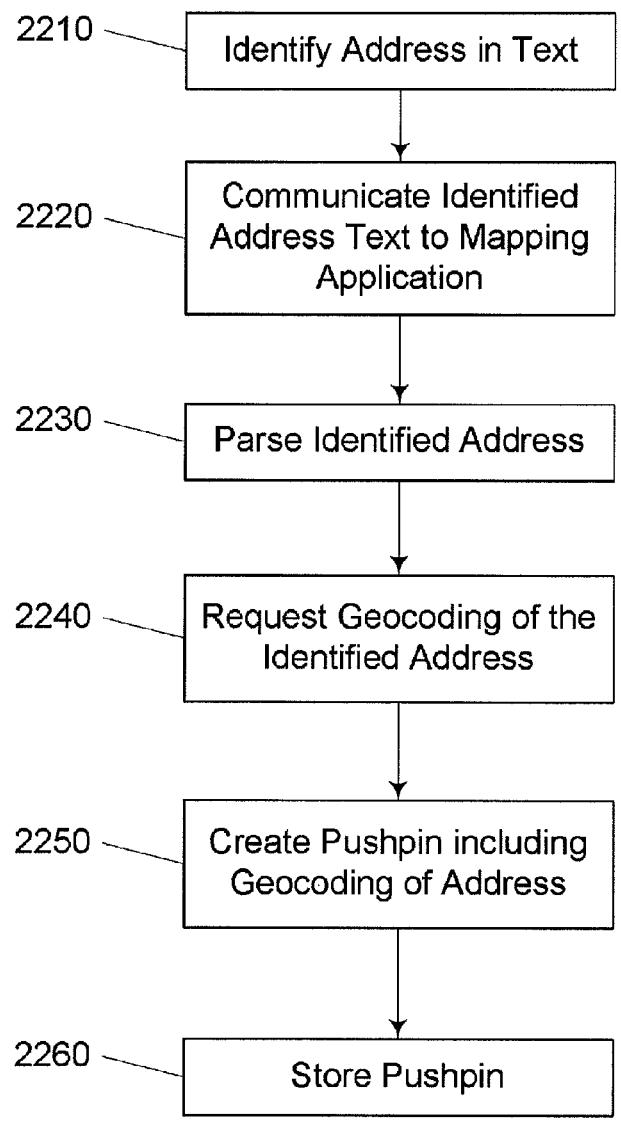
FIG. 22 is a flowchart illustrating one embodiment of a method for creating a geocoded pushpin from text identified as containing an address.

FIG. 22 is a flowchart illustrating one embodiment of a method for creating a geocoded pushpin from text identified as containing an address. Beginning at block 2210, an address is identified such as an address in a block of text. In one embodiment, the API module 210 is configured to interface with any other application or data source 211 on the electronic device 100 so as to provide an interface for automatically identifying an address, or allowing a user to manually identifying an address. In one embodiment, the data source 211 includes the smart tag feature of Microsoft Corporation's Office products. In such an embodiment, the API module 210 is configured to receive addresses identified by the smart tag software. Next at block 2220, the other application communicates the identified address, e.g., via the API module 210, to the mapping application module 202. Moving to block 2230, the mapping application module 202 parses the identified address, or converts the address into an appropriate pushpin format if the address has been parsed by the data source 211. Next at block 2240, the mapping application module 202 requests geocoding of the data by the geocoding engine module 208 or by a geocoding engine located on an intermediate server 240. By including geographic location data in the pushpin, the electronic device 100 can later use that data to display the pushpin correctly on a map even when the electronic device 100 does not include, or is not in contact with, a geocoding database. Thus, pushpin data can be shared between devices and displayed on a map by any other electronic device 100 regardless of whether the other electronic devices also include the geocoding engine module 208. In addition, the pushpin data with geographic location attached can be more efficiently processed later because addresses are not repeatedly geocoded each time the pushpin data is used or queried.

Moving to block 2250, the mapping application module 202 creates a pushpin including the geographic location data from the geocoding engine module 208. Next at block 2260, the mapping application module 202 stores the pushpin and its associated coordinate or pseudo-coordinate data. In one embodiment, the mapping application module 202 stores the pushpin via the database module 212.

Another embodiment includes a method of manually selecting a map area based in its display color, rather than the position tapped on the display screen. Electronic devices 100 increasingly include displays having higher color or grayscale bit resolution. For example, a 16 bit display can display over 64,000 shades of color. In other embodiments, the display color resolution ranges from 832 bits. Thus, many, if not most, maps can be created such that each country, region, or other area on the map can be colored or shaded in a different color. Thus, this embodiment is a method of efficiently determining which state, country, or other geographic region has been selected by a user based on the color of a selected display location. Identifying a map location based on the displayed color data may be particularly advantageous on devices that have limited processing or memory to avoid maintaining additional data structures for identifying a selected point with a map region or performing computationally intensive processing to identify a selected point with a map region.

Figure 23:
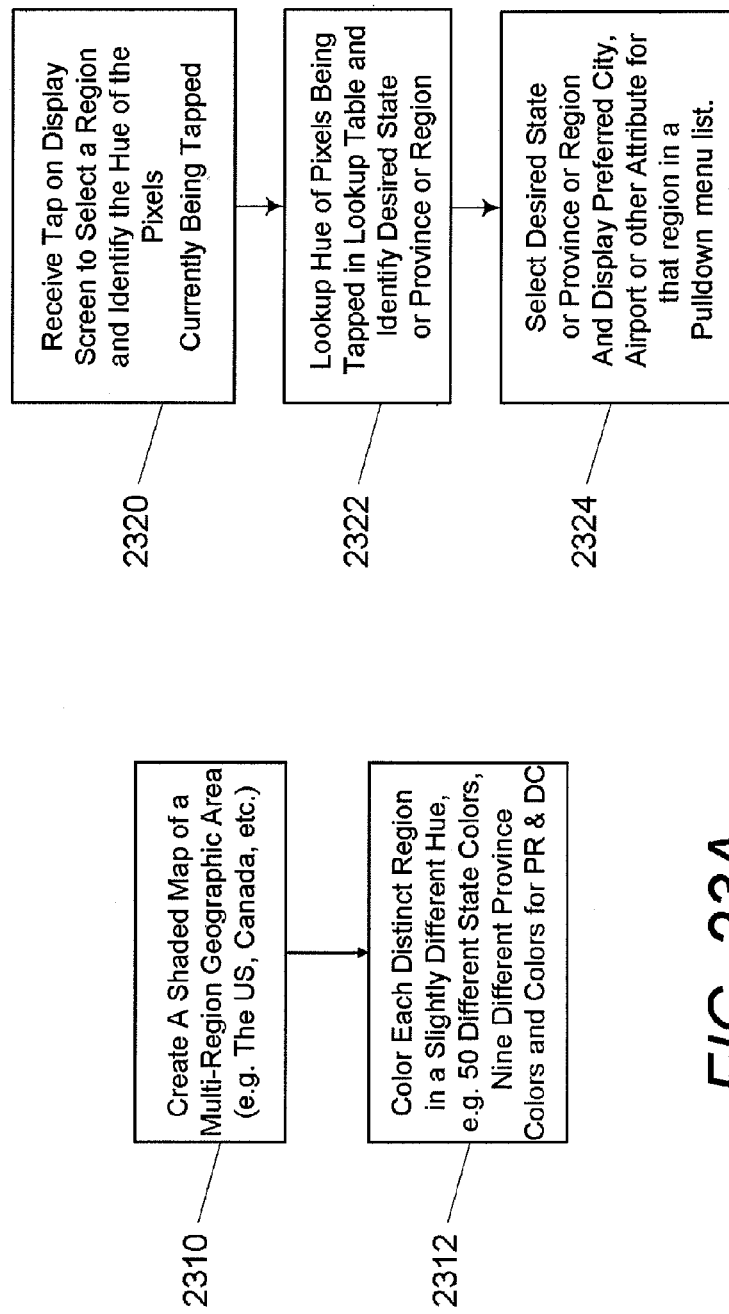
FIG. 23A is a flowchart illustrating one embodiment of a method of selecting colors for regions on a map.
FIG. 23B is a flowchart illustrating one embodiment of a method of identifying a selected region using a displayed map such as created using the method of FIG. 23A.

FIG. 23A is a flowchart illustrating one embodiment of a method of preparing such a map. Beginning at block 2310, a map of a selected area is created. Next at block 2310, each state, country, region or other area in the map is associated with a different color. In one embodiment, these colors are visually very close, e.g., one or two bits different from at least one other color. FIG. 23B is a flowchart illustrating one embodiment of a method of identifying a selected region using a displayed map such as created using the method of FIG. 23A. Beginning at block 2320, the user interface module 206 receives a control input associated with a particular location such as a pixel on a displayed map, e.g., from a mouse click or a stylus tap on a touchscreen, etc. The user interface module 206 determines the color of the selected location. Next at block 2322, the mapping application module 202 identifies one or more map items, such as state, province, county, or township name, associated with the region that is assigned the color of the selected location. Moving at block 2324, the user interface module 206 provides options for using the identified map items, such as selecting a municipality within the region selected. For example, in one embodiment, the preferred region interface discussed with reference to FIGS. 19A-19C is invoked.

Figure 24:
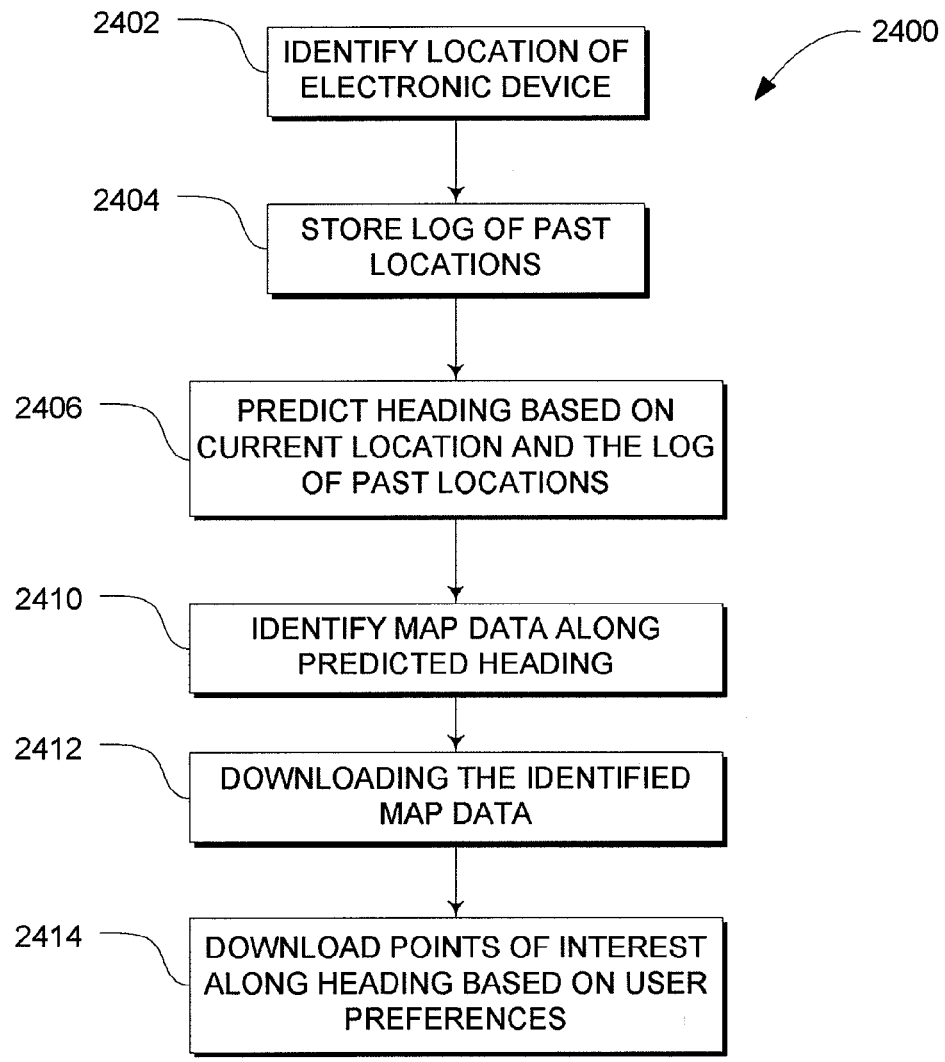
FIG. 24 is a flowchart illustrating an exemplary method of pre-caching data in a system such as illustrated in FIG. 1.

FIG. 24 is a flowchart illustrating an exemplary method 2400 of pre-caching data in a system such as the system 200. The method 2400 begins at a block 2402 in which the system 200 determines the location of the electronic device 100 via a location determination component such as the GPS 120. Next at a block 2404, the system 200 stores the position in a log. In one embodiment, the log is limited to a predetermined number of positions or to positions within a predetermined period of time. Next at a block 2406, the mapping application module 202 predicts the heading of the electronic device. In another embodiment, the prediction is based on the current heading determined by the GPS 120. In another embodiment, the prediction is based on a current location and the log of past locations. In one such embodiment, the mapping application module 202 averages the current position with the average of two or more previous positions Next at a block 2410, the mapping application module 202 identifies map segments along the heading that are not stored on the electronic device 100. In one embodiment, the mapping application module 202 determines a vector based on • the electronic devices heading and increases the length of the vector incrementally until it projects from the current location to a position for which the electronic device 100 lacks map data. In one embodiment, the increment of the vector length increase is based on the zoom level of the map. In one embodiment, the increment is about equal to size (e.g., width) of each map data segment at the current zoom level. Next at a block 2412, the mapping application module 202 downloads the identified map segments. In one embodiment, the number of identified map segments that are downloaded is reduced to a number that fits within the storage space of the electronic device. In another embodiment, the identified map segments are downloaded and may replace existing map segments in storage according to, in one embodiment, a cache replacement algorithm such as described with reference to FIG. 13.

Moving to a block 2414, the mapping application module 202 may also download geographically referenced contents such as points of interest or pushpins associated with the newly identified and downloaded map segments. In one embodiment, the points of interest are selected based on user preferences for data to be downloaded upon entering a new area. The points of interest data may include data such as traffic data, traffic incident data, or weather conditions in the newly identified map data segments. The method 2400 thus allows a device to preload map data that is likely to be needed so as to avoid download delays when the data is needed. In addition, this preloaded data may be downloaded when the electronic device 100 is in communication with map data management server 230 so that it is available even if the device 100 moves out of network communication. In one embodiment, the downloaded data is deleted when, for example, the predicted heading changes, or the device has moved beyond the corresponding map location along the route.

Figure 25:
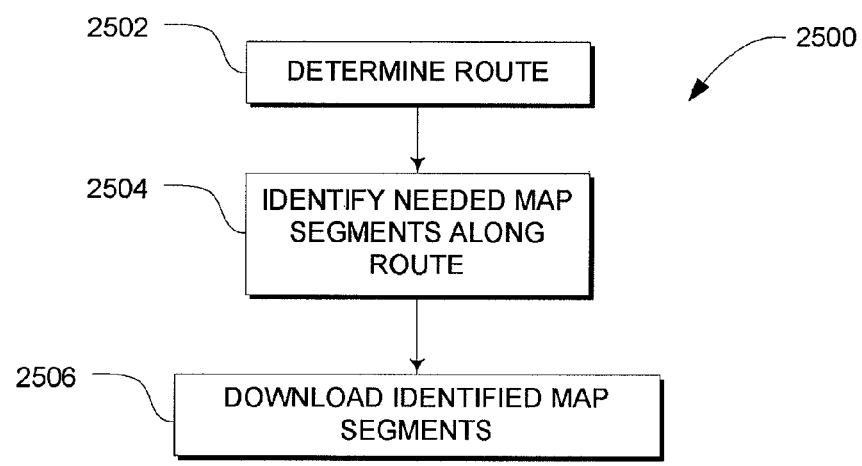
FIG. 25 is a flowchart illustrating another exemplary method of pre-caching data in a system such as illustrated in FIG. 1.

FIG. 25 is a flowchart illustrating another exemplary method 2500 of pre-caching data in a system such as the system 200. The method 2500 begins at a block 2502 in which the mapping application module 202 determines, or receives, a route to a particular location. In one embodiment, the system 200 provides interactive guidance for following the route. Next at a block 2504, the mapping application module 202 identifies map segments along the route that are not stored on the electronic device. Moving to a block 2506, the mapping application module downloads the identified map segments. In one embodiment, the downloading is limited by available storage on the device 100. In another embodiment, the downloaded data replaces existing data on the device according to a cache or storage management policy such as illustrated with reference to FIG. 14. In one embodiment, Depending on the embodiment, the acts or events of the exemplary methods illustrated herein can be performed in different sequences, can be merged, or can be left out altogether. (e.g., not all acts or events are necessary for the practice of the method), unless the text specifically and clearly states otherwise. In addition, the methods described herein can include additional acts or events unless the text specifically and clearly states otherwise. Moreover, unless clearly stated otherwise, acts or events may be performed concurrently, e.g., through interrupt processing or multiple processors, rather than sequentially. In one embodiment, the mapping application module 202 may also download points of interest or pushpins associated with the newly identified and downloaded map segments.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:
1. A method of downloading pushpin data, comprising:
receiving, from an electronic network, an indication of a current segment for geographically related data, the current segment comprising geographically related data for a current location of a device, the current segment cor- responding to a portion of geographically related content displayed on the device;

receiving pushpin criteria for the device;

identifying pushpin data based on the current segment and the pushpin criteria, the pushpin data indicating a pushpin location; and transmitting, on the electronic network, the pushpin data.

2. The method of claim 1, further comprising receiving a current segment index, wherein the current segment index indicates the current segment.

3. The method of claim 1, wherein the pushpin data indicates a plurality of pushpin locations.

4. The method of claim 1, further comprising:

receiving, from the electronic network, an indication of a new current segment, the new current segment comprising geographically related data for an updated current location of the device, the new current segment corresponding to a portion of geographically related content displayed on the device;

identifying new pushpin data based on the new current segment and the criteria, the new pushpin data indicating a second pushpin location; and transmitting, on the electronic network, the new pushpin data.

5. A method of downloading pushpin data, comprising:

displaying, by a device, a current segment of geographically related data, the current segment including geographically related data for a current location of the device and for a portion of geographically related content displayed on the device;

transmitting, to a second device, an indication of the current location;

transmitting, to the second device, an indication of criteria for pushpin data;

receiving, from the second device, pushpin data, the pushpin data indicating at least one pushpin location and meeting the criteria; and displaying, by the device, pushpin information on a display based on the received pushpin data.

6. The method of claim 5, wherein the received pushpin data comprises a plurality of pushpin locations and corresponding geographical pushpin indexes, and display of the pushpin information is further based on the geographical pushpin indexes.

7. The method of claim 6, wherein the geographically related content displayed on the device is formed by a plurality of rectangular segments, wherein the plurality of rectangular segments comprises the current segment.

8. The method of claim 7, wherein only pushpin locations that have geographical pushpin indexes corresponding to one of the plurality of rectangular segments are displayed.

9. The method of claim 8, wherein only pushpin locations that have geographical pushpin indexes equal to an index of one of the plurality of rectangular segments are displayed.

10. The method of claim 8, further comprising determining the geographical pushpin indexes based on the received pushpin data.

11. The method of claim 5, further comprising applying a second criteria to the received pushpin data, wherein the displayed pushpin data meets the second criteria.

12. The method of claim 11, wherein application of the second criteria selects pushpins from the pushpin data with particular layer identifiers.

13. An apparatus for downloading pushpin data, comprising one or more processors configured to:

receive, from an electronic network, an indication of a current segment, the current segment comprising geographically related data for a current location of a device, the current segment corresponding to a portion of geographically related content displayed on the device;

receive pushpin criteria for the device;

identify pushpin data based on the current segment and the pushpin criteria, the pushpin data indicating a pushpin location; and transmit, on the electronic network, the pushpin data.

14. The apparatus of claim 13, wherein the one or more processors are configured to receive a current segment index, wherein the current segment index indicates the current segment.

15. The apparatus of claim 13, wherein the pushpin data indicates a plurality of pushpin locations.

16. The apparatus of claim 13, wherein the one or more processors are further configured to:

receive, from the electronic network, an indication of a new current segment, the new current segment comprising geographically related data for an updated current location of the device, the new current segment corresponding to a portion of geographically related content displayed on the device;

identify new pushpin data based on the new current segment and the criteria, the new pushpin data indicating a second pushpin location; and transmit, on the electronic network, the new pushpin data.

17. A first device for downloading pushpin data, comprising:

an electronic display;

one or more processors configured to:

display a current segment, the current segment including geographically related data for a current location of the first device and for a portion of geographically related content displayed on the electronic display, transmit, to a second device, an indication of the current segment, transmit, to the second device, an indication of criteria for pushpin data, receive, from the second device, pushpin data, the pushpin data indicating at least one pushpin location and meeting the criteria, and display pushpin information on the display based on the received pushpin data.

18. The device of claim 17, wherein the received pushpin data comprises a plurality of pushpin locations and corresponding geographical pushpin indexes, and the one or more processors are further configured to display the pushpin information further based on the geographical pushpin indexes.

19. The device of claim 17 wherein the one or more processors are further configured to form geographically related content on the electronic display using a plurality of rectangular segments, wherein the plurality of rectangular segments comprises the current segment.

20. The device of claim 19, wherein the one or more processors are configured to display only pushpin locations that have geographical pushpin indexes corresponding to one of the plurality of rectangular segments.

21. The device of claim 20, wherein the one or more processors are configured to only display pushpin locations that have geographical pushpin indexes equal to an index of one of the plurality of rectangular segments.

22. The device of claim 20, wherein the one or more processors are further configured to determine the geographical pushpin indexes based on the received pushpin data.

23. The device of claim 17, wherein the one or more processors are configured to apply a second criteria to the received pushpin data, and are further configured to display pushpin data meeting the second criteria.

24. The device of claim 23, wherein application of the second criteria selects pushpins from the pushpin data with particular layer identifiers.

\* \* \* \* \*